(12) United States Patent
Bossolo et al.

(10) Patent No.: US 11,059,922 B2
(45) Date of Patent: Jul. 13, 2021

(54) METHOD FOR CROSS-LINKING POLYMERS

(71) Applicant: SOLVAY SPECIALTY POLYMERS ITALY S.P.A., Bollate (IT)

(72) Inventors: Stefano Bossolo, Parabiago (IT); Claudio Oldani, Parabiago (IT); Claudia Manzoni, Bologna (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 86 days.

(21) Appl. No.: 16/345,674

(22) PCT Filed: Oct. 17, 2017

(86) PCT No.: PCT/EP2017/076478
§ 371 (c)(1),
(2) Date: Apr. 26, 2019

(87) PCT Pub. No.: WO2018/077668
PCT Pub. Date: May 3, 2018

(65) Prior Publication Data
US 2019/0256631 A1    Aug. 22, 2019

(30) Foreign Application Priority Data
Oct. 28, 2016 (EP) .................................... 16196235

(51) Int. Cl.
| | | |
|---|---|---|
| *C08F 214/26* | (2006.01) | |
| *C08F 8/26* | (2006.01) | |
| *C08F 228/02* | (2006.01) | |
| *C08K 5/31* | (2006.01) | |
| *C08K 5/3432* | (2006.01) | |
| *C08F 8/30* | (2006.01) | |
| *C08K 3/22* | (2006.01) | |

(52) U.S. Cl.
CPC .............. *C08F 214/26* (2013.01); *C08F 8/26* (2013.01); *C08F 8/30* (2013.01); *C08F 228/02* (2013.01); *C08K 5/31* (2013.01); *C08K 5/3432* (2013.01); *C08F 214/262* (2013.01); *C08F 2800/10* (2013.01); *C08F 2800/20* (2013.01); *C08F 2810/20* (2013.01); *C08F 2810/50* (2013.01); *C08K 3/22* (2013.01); *C08K 2003/222* (2013.01)

(58) Field of Classification Search
CPC combination set(s) only.
See application file for complete search history.

(56) References Cited

U.S. PATENT DOCUMENTS

| | | | |
|---|---|---|---|
| 4,940,525 A | 7/1990 | Ezzell et al. | |
| 6,670,424 B1 | 12/2003 | Michot et al. | |
| 6,733,914 B1 | 5/2004 | Grot et al. | |
| 10,766,989 B2 * | 9/2020 | Fantoni .................... | C08L 27/16 |
| 2003/0148158 A1 * | 8/2003 | Ameduri ................. | C08F 14/22 |
| | | | 526/255 |
| 2014/0017599 A1 * | 1/2014 | Merlo ....................... | C08J 5/225 |
| | | | 429/494 |

FOREIGN PATENT DOCUMENTS

| | | |
|---|---|---|
| EP | 1172382 A2 | 1/2002 |
| EP | 1238999 A1 | 9/2002 |
| EP | 1239000 A1 | 9/2002 |
| EP | 1323751 A2 | 7/2003 |
| WO | 99038897 A1 | 8/1999 |
| WO | 2007142885 A1 | 12/2007 |
| WO | 2007142886 A2 | 12/2007 |
| WO | 2012136688 A1 | 10/2012 |
| WO | WO-2014173782 A1 * | 10/2014 ............. C08L 27/18 |

* cited by examiner

*Primary Examiner* — Nicole M. Buie-Hatcher
(74) *Attorney, Agent, or Firm* — Osha Bergman Watanabe & Burton LLP

(57) ABSTRACT

The invention relates to a method for manufacturing a cross-linked polymer comprising reacting at least one polymer having at least one —$SO_2X$ group, with X being F or Cl, a basic compound, and certain salts including a ring-quaternized pyridinium-type nitrogen, and possessing at least two groups in ortho or para position thereto comprising reactive hydrogen atoms; cross-linking has been proven to proceed effectively, delivering cross-linked polymers possessing improved chemical resistance and mechanical performances.

20 Claims, No Drawings

METHOD FOR CROSS-LINKING POLYMERS

CROSS-REFERENCE TO RELATED APPLICATION

This application is a U.S. national stage entry under 35 U.S.C. 071 of International Application No. PCT/EP2017/076478 filed Oct. 17, 2017, which claims priority to European application No. EP 16196235.2 filed Oct. 28, 2016 The entire contents of these applications are explicitly incorporated herein by this reference.

TECHNICAL FIELD

The present invention relates to a method for preparing cross-linked polymers having sulfonic groups by reaction among certain pyridinium salts and certain polymers comprising sulfonyl groups, to certain cross-linkable polymers obtained therefrom, to shaped articles, in particular membranes, comprising the cross-linked polymers obtained therefrom.

BACKGROUND ART

Polymers containing sulfonic acid functional groups, and, specifically, fluorinated polymers containing the same, due to their ion conducting properties, have found widespread use in the manufacture of electrolyte membranes for electrochemical devices such as electrolysis cells and fuel cells. Notable examples are for instance proton exchange membrane (PEM) fuel cells which employ hydrogen as the fuel and oxygen or air as the oxidant.

Fluorinated polymers containing sulfonic acid functional groups have also been known to provide hydrophilic fluorinated surfaces due to the presence of the sulfonic acid groups.

To provide a high proton transport capability to an electrolyte membrane or to efficiently interact with water in a hydrophilic fluorinated surface polymers having a high number of sulfonic acid groups are required, which however are generally provided with reduced mechanical and physical resistance with consequent negative effects on the duration of the articles obtained therefrom.

The use of cross-linking to improve the physical resistance of membranes made from fluorinated polymers containing sulfonic acid functional groups has been previously disclosed. For instance, EP 1238999 A (SOLVAY SOLEXIS SPA) 11 Sep. 2002 and EP 1239000 A (SOLVAY SOLEXIS SPA) 11 Sep. 2002 disclose hydrophilic membranes comprising cross-linkable sulfonic fluorinated polymers comprising: monomeric units deriving from tetrafluoroethylene, fluorinated monomeric units containing sulfonyl groups —SO$_2$F, and from 0.01% to 5% by moles of monomeric units deriving from a bis-olefin of formula (I): R$_1$R$_2$C=CH—(CF$_2$)$_m$—CH=CR$_5$R$_6$ (wherein m=2-10, R$_1$, R$_2$, R$_5$, R$_6$, equal to or different from each other, are H or C$_1$-C$_5$ alkyl groups). The membranes are obtained by cross-linking of the sulfonic fluorinated polymer, the cross-linking involving the backbone of the polymer. The membranes are suitable both for use as ion conducting membranes in electrochemical cells as well as filtration membranes.

Cross-linking of fluorinated polymers involving the sulfonyl fluoride functional group precursor to the sulfonic acid functional group has also been previously described. U.S. Pat. No. 6,733,914 (ION POWER, INC.) Nov. 5, 2004 discloses ion exchange membranes comprising cross-linked polymers having the following structure:

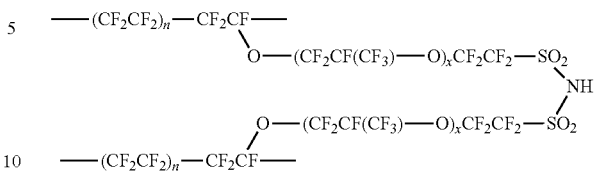

obtained by treatment of the fluorinated polymer comprising —SO$_2$F functional groups with ammonia, followed by hydrolysis of the residual —SO$_2$F functional groups with a strong base and then by heat treatment. The resulting bridging group has however a limiting effect on the water absorption ability of the membrane.

WO 2007/142885 A (E.I. DU PONT DE NEMOURS) 13 Dec. 2007 and WO 2007/142886 A (E.I. DU PONT DE NEMOURS) 13 Dec. 2007 similarly disclose the cross-linking of fluorinated polymers involving the reaction of —SO$_2$F functional groups. In particular these documents disclose the cross-linking of polymers comprising 95% to 5% of —SO$_2$X functional groups (X=halogen) and 5% to 95% of —SO$_2$X functional groups that have reacted with a nucleophilic compound Y with a cross-linkable compound having the potential to form cross-links with the —SO$_2$X functional groups. The cross-linkable compound thus reacts with the residual —SO$_2$X functional groups in the fluorinated polymer. It has to be noted that the cross-linking reaction between the —SO$_2$F (or —SO$_2$X) functional groups and the cross-linking compound may lead to the formation of hydrogen fluoride (or HX) which has to be properly removed from the resulting cross-linked polymer.

Additionally, the resulting membranes comprising the cross-linked fluorinated polymer have to be submitted to hydrolysis and acidification treatment to transform the —SO$_2$X functional groups that have not reacted with the cross-linking compound and the —SO$_2$X functional groups reacted with the nucleophilic compound Y in the ion conducting acid —SO$_3$H form.

WO 2012/136688 (SOLVAY SPECIALTY POLYMERS IT) Nov. 10, 2012 pertains to a process for the preparation of cross-linked fluorinated polymers comprising sulfonic acid functional groups comprising the step of reacting a fluorinated polymer (P) having —SO$_3$M functional group, with M being H or an alkaline metal, with at least one cross-linking polyamine agent of formula R(X)$_n$ wherein R is selected from a bond, O, S, N or R is an aromatic or aliphatic group, linear, cyclic, branched, optionally substituted and/or fluorinated, optionally comprising heteroatoms; n is an integer >2; and wherein X is a functional group selected from the group consisting of —NH$_2$, —NHR$_a$, wherein R$_a$=C$_1$-C$_{20}$ alkyl, —Si(R$_b$)$_3$, and R$_b$=C$_1$-C$_5$ alkyl, —OH, —SO$_2$W, wherein W=OH, F, Cl, Br, I, so as to promote the formation of covalent bonds between the —SO$_3$M and the amine group of the polyamine agent.

From the foregoing it becomes apparent that the need still exist for providing articles, in particular membranes, with improved physical and mechanical resistance by the cross-linking of fluorinated polymers comprising sulfonic acid functional groups without affecting the ion conducting capability and hydrophilicity of the polymer.

SUMMARY OF INVENTION

The Applicant has now found that it is possible to manufacture cross-linked polymers by reacting polymers comprising —SO₂X groups, with X being Cl or F, with certain pyridinium salts and certain bases, so as to provide cross-linked polymers which are effective for solving the aforementioned technical problems.

It is hence a first object of the present invention a method for manufacturing a cross-linked polymer [polymer (XPL)], said method comprising reacting:

- at least one polymer having at least one —SO₂X group, with X being F, Cl [polymer (I)];
- at least one basic compound [base (B)];
- at least one pyridinium salt [salt (P)] complying with any of formulae (P1) to (12):

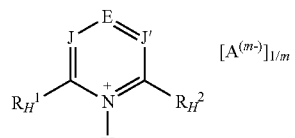
(P-1)

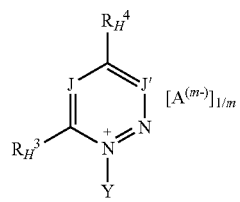
(P-2)

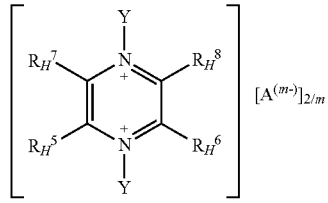
(P-3)

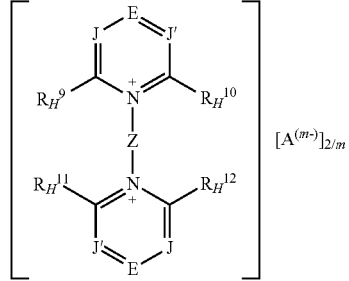
(P-4)

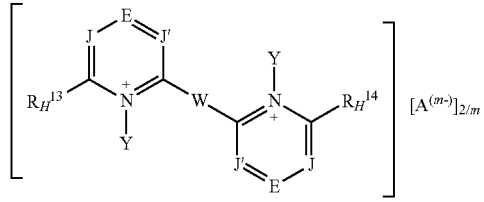
(P-5)

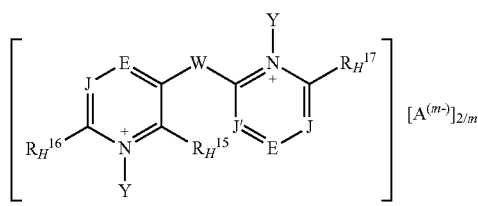
(P-6)

-continued

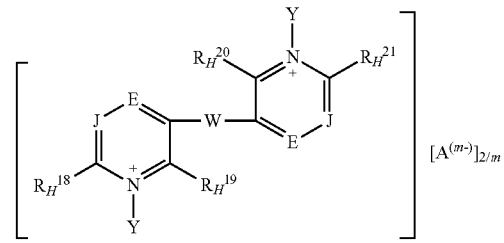
(P-7)

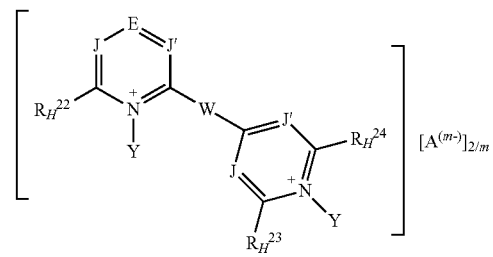
(P-8)

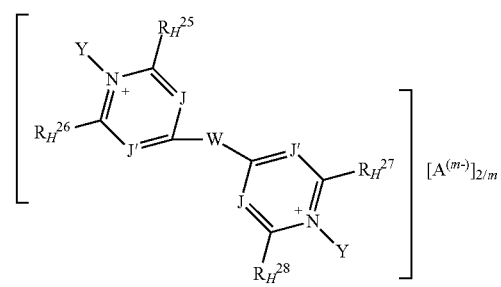
(P-9)

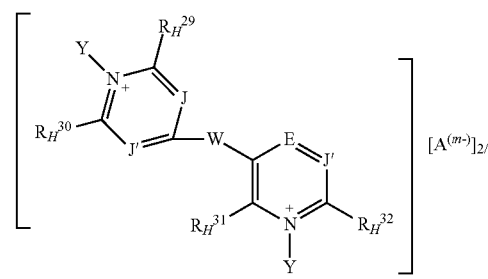
(P-10)

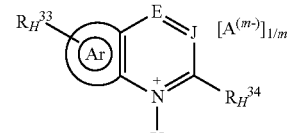
(P-11)

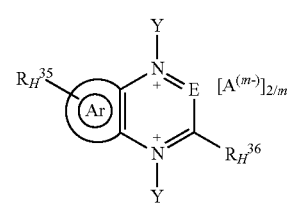
(P-12)

wherein:
each occurrence C—R* or N, wherein R* is H or a $C_1$-$C_{12}$ hydrocarbon group;
E is N or a group of formula C—$R°_H$;
Z is a divalent hydrocarbon group comprising from 1 to 12 carbon atoms;
W is a bond or is a bridging group selected from the group consisting of divalent hydrocarbon groups comprising from 1 to 12 carbon atoms (preferably divalent aliphatic groups comprising from 1 to 6 carbon atoms) and divalent fluorocarbon groups comprising from 1 to 12 carbon atoms (preferably divalent perfluoroaliphatic groups comprising from 1 to 6 carbon atoms);
the group sketched with symbol:

in formula (P-11) and (P-12) designates an aromatic mono- or poly-nuclear ring condensed to the pyridinium-type aromatic ring, which may comprise one or more additional nitrogen atoms, optionally quaternized nitrogen atoms, in the ring(s);
each of $R^1_H$, $R^2_H$, $R^3_H$, $R^4_H$, $R^5_H$, $R^6_H$, $R^7_H$, $R^5_H$, $R^9_H$, $R^{10}_H$, $R^{11}_H$, $R^{12}_H$, $R^{13}_H$, $R^{14}_H$, $R^{15}_H$, $R^{16}_H$, $R^{17}_H$, $R^{18}_H$, $R^{19}_H$, $R^{20}_H$, $R^{21}_H$, $R^{22}_H$, $R^{23}_H$, $R^{24}_H$, $R^{25}_H$, $R^{26}_H$, $R^{27}_H$, $R^{28}_H$, $R^{29}_H$, $R^{30}_H$, $R^{31}_H$, $R^{32}_H$, $R^{33}_H$, $R^{34}_H$, $R^{35}_H$, $R^{36}_H$ and $R°_H$, equal to or different from each other, is independently at each occurrence —H or a group of formula [group (alpha-H)]:

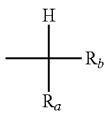

wherein $R_a$, and $R_b$, equal to or different from each other, are independently H or a hydrocarbon $C_1$-$C_6$ group;
Y, equal to or different from each other, is independently oxygen or a $C_1$-$C_{12}$ hydrocarbon group, which can be notably an aliphatic or an aromatic group, which can comprise one or more than one heteroatoms selected from N, O, S and halogens;
$A^{(m-)}$ is an anion having valency m;
with the proviso that
(i) when salt (P) is of formula (P-1) at least two of $R^1_H$, $R^2_H$, and $R°_H$ are groups (alpha-H);
(ii) when salt (P) is of formula (P-2) $R^3_H$ and $R^4_H$ are groups (alpha-H);
(iii) when salt (P) is of formula (P-3), at least two of $R^5_H$, $R^6_H$, $R^7_H$, and $R^8_H$ are groups (alpha-H);
(iv) when salt (P) is of formula (P-4), at least two of $R^9_H$, $R^{10}_H$, $R^{11}_H$, $R^{12}_H$, and $R°_H$ are groups (alpha-H);
(v) when salt (P) is of formula (P-5), at least two of $R^{13}_H$, $R^{14}_H$, and $R°_H$ are groups (alpha-H);
(vi) when salt (P) is of formula (P-6), at least two of $R^{15}_H$, $R^{16}_H$, $R^{17}_H$, and $R°_H$ are groups (alpha-H);
(vii) when salt (P) is of formula (P-7), at least two of $R^{18}_H$, $R^{19}_H$, $R^{20}_H$, $R^{21}_H$, and $R°_H$ are groups (alpha-H);
(viii) when salt (P) is of formula (P-8), at least two of $R^{22}_H$, $R^{23}_H$, $R^{24}_H$, and $R°_H$ are groups (alpha-H);
(ix) when salt (P) is of formula (P-9), at least two of $R^{25}_H$, $R^{26}_H$, $R^{27}_H$, and $R^{28}_H$ are groups (alpha-H);
(x) when salt (P) is of formula (P-10), at least two of $R^{29}_H$, $R^{30}_H$, $R^{31}_H$, $R^{32}_H$, and $R^{28}_H$ are groups (alpha-H);
(xi) when salt (P) is of formula (P-11), at least two of $R^{33}_H$, $R^{34}_H$, and $R^{28}_H$ are groups (alpha-H);
(xii) when salt (P) is of formula (P-12), at least two of $R^{35}_H$, $R^{36}_H$ and $R°_H$ are groups (alpha-H).

The group alpha-H comprises a central carbon atom which bears at least a hydrogen atom and which is covalently bound to a $sp^2$-hybridized carbon of the pyridinium-ring (annular carbon): as the annular carbon is in ortho or para position to the quaternized nitrogen of the pyridinium ring, the hydrogen atom(s) of the group alpha-H possess(es) suitable reactivity to generate, under certain conditions, corresponding carbanions.

The Applicant has surprisingly found that salts (P) of any of formulae (P-1) to (P-12) including a ring-quaternized pyridinium-type nitrogen, and possessing at least two groups in ortho or para position with respect to the said ring-quaternized pyridinium-type nitrogen comprising said reactive hydrogen atoms, when combined with basic compounds as above detailed, are effective cross-linking agents for the cross-linking of polymers possessing sulfonyl chloride or sulfonyl fluoride groups. More specifically, cross-linking has been proven to proceed effectively, delivering polymers possessing improved chemical resistance and mechanical performances.

Without being bound by this theory, the Applicant thinks that the groups in the said ortho or para position comprising at least one hydrogen atom in alpha position with respect to the aromatic ring possess acidic character, so as to give rise, in the presence of the base (B), to corresponding carbanion; the so formed carbanions have sufficient reactivity/nucleophilic character to react with sulfonyl groups so as to create covalent bonds between polymer chains (P) which can be schematized as (P)—$SO_2$—C($R_a$)($R_b$)-py-C($R_a$)($R_b$)—$SO_2$—(P), whereas $R_a$ and $R_b$ have the meaning as above detailed, and "py" represents any of the pyridinium salt-like groups, as detailed above in salt (P), so as to generate a three-dimensional crosslinked network.

DESCRIPTION OF INVENTION

Polymer (I)
Polymer (I) comprises at least one —$SO_2X$ group, with X being F, Cl.

The amount of —$SO_2X$ groups (with X being F or Cl) in polymer (I) is generally of at least 0.01, preferably at least 0.05, more preferably at least 0.1 meq/g. There's no substantial limitation as per the maximum amount of the said —$SO_2X$ groups comprised in polymer (I). It is generally understood that when the said —$SO_2X$ groups in polymer (I) are solely functional to the aim of achieving the hereby intended cross-linking, or, otherwise said, are solely useful as cure-sites, the amount of —$SO_2X$ groups can be generally of at most 1 meq/g, preferably at most 0.8 meq/g, more preferably at most 0.5 meq/g. On the other side, when the said —$SO_2X$ groups are further intended to be relied for conferring to cross-linked polymer (XPL) additional properties/chemistry, e.g. ionic exchange capability upon hydrolysis thereof, the amount of —$SO_2X$ groups can be generally of at most 5 meq/g, preferably at most 4 meq/g, more preferably at most 3 meq/g.

It is possible for polymer (I) to simultaneously comprise, in addition to the said —$SO_2X$ group, one or more than one —$SO_3M$ groups, with M being H or a cation (e.g. a metal cation or an ammonium cation). Nevertheless, it is generally understood that the polymer (I) comprises —$SO_2X$ groups in an amount of at least 50%, preferably at least 60%, more preferably at least 75%, with respect to the total number of —$SO_3M$ and —$SO_2X$ groups in polymer (I).

Generally, polymer (I) comprises said —$SO_2X$ groups as pendant groups covalently bound to recurring units derived from a —$SO_2X$ functional monomer (monomer (X), herein below).

Polymer (I) may consist essentially of recurring units derived from one or more than one monomer (X), as above detailed, or can be a copolymer comprising recurring units derived from one or more than one monomer (X) and recurring units derived from one or more than one additional monomer different from monomer (X).

According to preferred embodiments polymer (I) is a fluorinated polymer [polymer (FI)].

Generally, —$SO_2X$ groups of polymer (FI) are groups of formula —$SO_2F$.

Suitable polymers (FI) comprising at least one —$SO_2X$ group are those polymers comprising recurring units deriving from at least one ethylenically unsaturated fluorinated monomer containing at least one —$SO_2X$ group, with X being F or Cl (monomer (A), hereinafter); and recurring units deriving from at least one ethylenically unsaturated fluorinated monomer free from —$SO_2X$ group, with X being F or Cl (monomer (B), hereinafter).

The phrase "at least one monomer" is used herein with reference to monomers of both type (A) and (B) to indicate that one or more than one monomer of each type can be present in the polymer. Hereinafter the term monomer will be used to refer to both one and more than one monomer of a given type.

Non limiting examples of suitable monomers (A) are:
sulfonyl halide fluoroolefins of formula: $CF_2=CF(CF_2)_pSO_2X$, with X being F or Cl, preferably F, wherein p is an integer between 0 and 10, preferably between 1 and 6, more preferably p is equal to 2 or 3;
sulfonyl halide fluorovinylethers of formula: $CF_2=CF—O—(CF_2)_mSO_2X$, with X being F or Cl, preferably F, wherein m is an integer between 1 and 10, preferably between 1 and 6, more preferably between 2 and 4, even more preferably m equals 2;
sulfonyl fluoride fluoroalkoxyvinylethers of formula: $CF_2=CF—(OCF_2CF(R_{F1}))_w—O—CF_2(CF(R_{F2}))_ySO_2X$
with X being F or Cl, preferably F, wherein w is an integer between 0 and 2, $R_{F1}$ and $R_{F2}$, equal or different from each other, are independently F, Cl or a $C_1$-$C_{10}$ fluoroalkyl group, optionally substituted with one or more ether oxygens, y is an integer between 0 and 6; preferably w is 1, $R_{F1}$ is —$CF_3$, y is 1 and $R_{F2}$ is F;
sulfonyl halide aromatic fluoroolefins of formula $CF_2=CF—Ar—SO_2X$ with X being F or Cl, preferably F, wherein Ar is a $C_5$-$C_{15}$ aromatic or heteroaromatic group.

Preferably monomer (A) is selected from the group of the sulfonyl fluoride fluorovinylethers of formula $CF_2=CF—O—(CF_2)_m—SO_2F$, wherein m is an integer between 1 and 6, preferably between 2 and 4.

More preferably monomer (A) is $CF_2=CFOCF_2CF_2—SO_2F$ (perfluoro-5-sulfonylfluoride-3-oxa-1-pentene).

Non limiting examples of suitable ethylenically unsaturated fluorinated monomers of type (B) are:
$C_2$-$C_8$ perfluoroolefins, such as tetrafluoroethylene (TFE), hexafluoropropylene (HFP),
$C_2$-$C_8$ hydrogen-containing fluoroolefins, such as trifluoroethylene (TrFE), vinylidene fluoride (VDF), vinyl fluoride (VF), pentafluoropropylene, and hexafluoroisobutylene;
$C_2$-$C_8$ chloro- and/or bromo- and/or iodo-containing fluoroolefins, such as chlorotrifluoroethylene (CTFE) and bromotrifluoroethylene;
fluoroalkylvinylethers of formula $CF_2=CFOR_{f1}$, wherein $R_{f1}$ is a $C_1$-$C_6$ fluoroalkyl, e.g. —$CF_3$, —$C_2F_5$, —$C_3F_7$;
fluoro-oxyalkylvinylethers of formula $CF_2=CFOR_{O1}$, wherein $R_{O1}$ is a $C_1$-$C_{12}$ fluoro-oxyalkyl having one or more ether groups, for example perfluoro-2-propoxy-propyl;
fluoroalkyl-methoxy-vinylethers of formula $CF_2=CFOCF_2OR_{f2}$ in which $R_{f2}$ is a $C_1$-$C_6$ fluoroalkyl, e.g. —$CF_3$, —$C_2F_5$, —$C_3F_7$ or a $C_1$-$C_6$ fluorooxyalkyl having one or more ether groups, like —$C_2F_5$—O—$CF_3$;
fluorodioxoles, of formula:

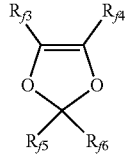

wherein each of $R_{f3}$, $R_{f4}$, $R_{f5}$, $R_{f6}$, equal or different each other, is independently a fluorine atom, a $C_1$-$C_6$ fluoro(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Preferably monomer (B) is selected among:
$C_2$-$C_8$ perfluoroolefins, preferably tetrafluoroethylene (TFE) and/or hexafluoropropylene (HFP);
chloro- and/or bromo- and/or iodo-containing $C_2$-$C_6$ fluoroolefins, like chlorotrifluoroethylene (CTFE) and/or bromotrifluoroethylene;
fluoroalkylvinylethers of formula $CF_2=CFOR_{f1}$ in which $R_{f1}$ is a $C_1$-$C_6$fluoroalkyl, e.g. —$CF_3$, —$C_2F_5$, —$C_3F_7$;
fluoro-oxyalkylvinylethers of formula $CF_2=CFOR_{O1}$, in which $R_{O1}$ is a $C_1$-$C_{12}$ fluorooxyalkyl having one or more ether groups, like perfluoro-2-propoxy-propyl;
mixtures thereof.

More preferably, at least one monomer (B) is TFE.

Preferably, polymer (I) is a fluorinated polymer comprising at least one —$SO_2F$ functional group, and consists essentially of recurring units deriving from at least one ethylenically unsaturated fluorinated monomer (A) containing at least one sulfonyl fluoride functional group and from at least one ethylenically unsaturated fluorinated monomer (B).

End-groups, impurities, defects and other spurious units in limited amount (less than 1% moles, with respect to total moles of recurring units) may be present in the preferred polymer, in addition to the listed recurring units, without this affecting substantially the properties of the polymer.

Preferred polymer (I) is selected from fluorinated polymers consisting essentially of:
(1) recurring units derived from tetrafluoroethylene (TFE), these recurring units (1) being generally in an amount of 25 to 99.9% moles, preferably 40 to 99.5% moles, with respect to total moles of polymer (I);

(2) recurring units derived from at least one monomer selected from the group consisting of:

(j) sulfonyl halide fluorovinylethers of formula: $CF_2=CF—O—(CF_2)_mSO_2X$, with X being F or Cl, preferably F, wherein m is an integer between 1 and 10, preferably between 1 and 6, more preferably between 2 and 4, even more preferably m equals 2;

(jj) sulfonyl fluoride fluoroalkoxyvinylethers of formula: $CF_2=CF—(OCF_2CF(R_{F1}))_w—O—CF_2(CF(R_{F2}))_ySO_2X$
with X being F or Cl, preferably F, wherein w is an integer between 0 and 2, $R_{F1}$ and $R_{F2}$, equal or different from each other, are independently F, Cl or a $C_1$-$C_{10}$ fluoroalkyl group, optionally substituted with one or more ether oxygens, y is an integer between 0 and 6; preferably w is 1, $R_{F1}$ is —$CF_3$, y is 1 and $R_{F2}$ is F; and (jjj) mixtures thereof;
these recurring units (2) being generally in an amount of 0.1 to 30% moles, preferably 0.5 to 20% moles, with respect to total moles of polymer (I); and (3) optionally, recurring units derived from at least one fluorinated monomer different from TFE, preferably a perfluorinated monomer, generally selected from the group consisting of hexafluoropropylene, perfluoroalkylvinylethers of formula $CF_2=CFOR'_{f1}$, wherein $R'_{f1}$ is a $C_1$-$C_6$ perfluoroalkyl, e.g. —$CF_3$, —$C_2F_5$, —$C_3F_7$; perfluoro-oxy-alkylvinylethers of formula $CF_2=CFOR'_{O1}$, wherein $R'_{O1}$ is a $C_2$-$C_{12}$ perfluoro-oxyalkyl having one or more ether groups; and perfluoroalkyl-methoxy-vinylethers of formula $CF_2=CFOCF_2OR'_{f2}$ in which $R'_{f2}$ is a $C_1$-$C_6$ perfluoroalkyl, e.g. —$CF_3$, —$C_2F_5$, —$C_3F_7$ or a $C_1$-$C_6$ perfluorooxyalkyl having one or more ether groups, like —$C_2F_5$—O—$CF_3$; these recurring units (3) being generally in an amount of 0 to 45% moles, preferably 0 to 40% moles, with respect to total moles of polymer (I).

For embodiment's wherein the said —$SO_2X$ groups in polymer (I) are solely functional to the aim of achieving the hereby intended cross-linking, the preferred polymer (I) generally consists essentially of:

(1) from 45 to 79.9% moles, preferably from 55 to 69.5% moles of recurring units derived from TFE;

(2) from 0.1 to 10% moles, preferably from 0.5 to 5% moles of recurring units derived from —$SO_2X$ groups-containing monomer(s) (2), as above detailed;

(3) from 20 to 45% moles, preferably from 30 to 40% moles of recurring units derived from fluorinated monomer(s) different from TFE (3), as above detailed.

For embodiment's wherein the said —$SO_2X$ groups in polymer (I) are further intended to be relied for conferring to cross-linked polymer (XPL) additional properties/chemistry, e.g. ionic exchange capability upon hydrolysis thereof, the preferred polymer (I) generally consists essentially of:

(1) from 55 to 95% moles, preferably from 70 to 92% moles of recurring units derived from TFE;

(2) from 5 to 30% moles, preferably from 8 to 20% moles of recurring units derived from —$SO_2X$ groups-containing monomer(s) (2), as above detailed;

(3) from 0 to 15% moles, preferably from 0 to 10% moles of recurring units derived from fluorinated monomer(s) different from TFE (3), as above detailed.

The fluorinated polymer comprising at least one —$SO_2F$ functional group may be prepared by any polymerization process known in the art. Suitable processes for the preparation of such polymers are for instance those described in U.S. Pat. No. 4,940,525 (THE DOW CHEMICAL COMPANY) 10 Jul. 1990, EP 1323751 A (SOLVAY SOLEXIS SPA) 2 Jul. 2003, EP 1172382 A (SOLVAY SOLEXIS SPA) 16 Nov. 2002.

The fluorinated polymer comprising at least one —$SO_2F$ functional group may be optionally treated, e.g. with elemental fluorine, to remove polar chain end-groups to provide a fully fluorinated structure.

In the method of the invention, polymer (I) may be provided in any physical form.

According to a first embodiment polymer (I) may be provided in solid form, for instance in the form of powder, pellets, granules, slabs or in the form of a shaped article, e.g. under the form of an essentially bi-dimensional shaped article, e.g. a film or a sheet.

From a practical point of view, any shaped article is three-dimensional, and can thus be characterized notably by three characteristic dimensions ("length", "width" and "height"/"thickness"). However, some shaped articles are such that one or two of their characteristic dimensions is (are) considerably lower than respectively the other two ones or the third one.

Precisely, for the purpose of the present invention an essentially bi-dimensional shaped article is intended to denote a shaped article of which one of its characteristic dimensions ("thickness-height") is considerably lower than its other two ones ("width" and "length"). Here, the terms "considerably lower" should generally be understood as "more than 5 times lower" and preferably as "more than 10 times lower".

The polymer (I) may be notably provided under the form of a film or under the form of a sheet.

According to a second embodiment polymer (I) may be provided in the form of a liquid composition comprising the polymer (I) under dissolved or dispersed form in a suitable liquid phase. The term "dissolved form" is intended to denote a "true" solution of the polymer (I). The wording "dispersed form" is hereby intended to denote a colloidal suspension of the polymer (I), whereby particles of polymer (I) of average particle size of generally less than 500 nm are stably suspended with no settlement phenomena when left in unperturbed state.

The liquid composition may be provided through emulsion polymerizing at least one monomer (X) comprising at least one —$SO_2X$ group and optionally one or more than one additional monomer different from monomer (X) in an aqueous phase.

In this case, the liquid composition will comprise polymer (I) and a liquid medium essentially consisting of water. The liquid medium may additionally comprise auxiliaries, additives, and additional ingredients, notably either added to the emulsion-polymerized liquid composition for improving e.g. its colloidal stability, or already contained in the emulsion-polymerized liquid composition, as a result of ingredients used in polymerization.

Generally, liquid composition may comprise one or more than one surfactant.

As an alternative, advantageously, the liquid composition may be prepared by a dissolution process wherein polymer (I) is contacted with a liquid medium under suitable temperature conditions.

Typically, the liquid composition comprising polymer (I) comprises a liquid medium comprising water. Generally, the liquid composition comprises a water or water/alcoholic mixture as liquid medium, optionally comprising additional ingredients and/or additives.

Suitable alcohols which can be used, in particular as water/alcoholic mixture, are notably methanol, ethanol, propyl alcohols (i.e. isopropanol, n-propanol), ethylene glycol, diethylene glycol.

Other liquid media that can be used are polar aprotic organic solvents such as ketones, like acetone, methylethylketone, esters, like methylacetate, dimethylcarbonate, diethylcarbonate, ethylacetate, nitriles, like acetonitrile, sulphoxides, like dimethylsulfoxide, amides, like N,N-dimethylformamide, N,N-dimethylacetamide, pyrrolidones, like N-methylpyrrolidone, N-ethylpyrrolidone.

In general, good results have been obtained with liquid compositions wherein the liquid medium is water or a mixture of water and alcohol, preferably of water and propyl alcohol(s).

The liquid composition may advantageously be prepared by contacting the polymer (I) with water or a mixture of water and alcohol, at a temperature of from 40° C. to 300° C. in an autoclave.

The Salt (P)

Preferred salts (P) of formula (P-1) are those complying with formulae (P-1-a) to (P-1-e):

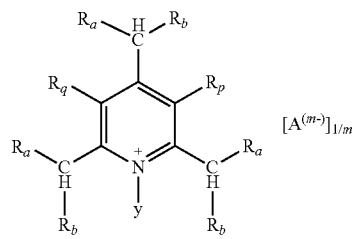
(P-1-a)

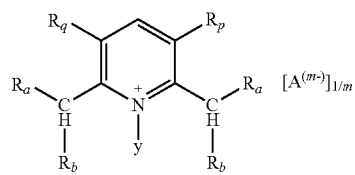
(P-1-b)

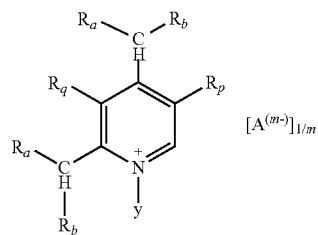
(P-1-c)

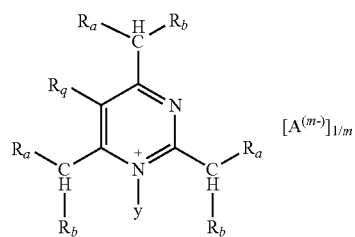
(P-1-d)

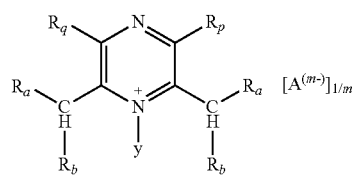
(P-1-e)

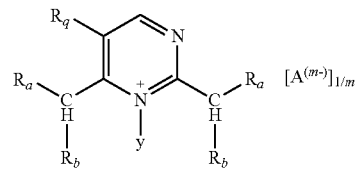
(P-1-f)

wherein:

$R_a$ and $R_b$ have the meaning as above defined, preferably $R_a$ and $R_b$ are H;

Y has the meaning as defined above, preferably Y is methyl;

each of $R_p$ and $R_q$, equal to or different from each other, is H or a $C_1$-$C_{12}$ hydrocarbon group;

A and m have the meanings as above defined.

More preferably, salts (P) of formula (P-1) are those having any of formulae (P-1-g) to (P-1-p):

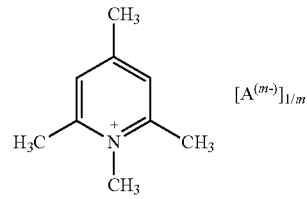
(P-1-g)

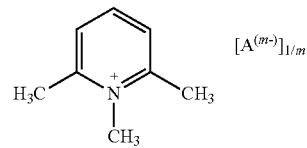
(P-1-h)

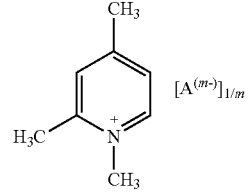
(P-1-i)

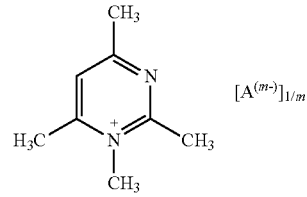
(P-1-l)

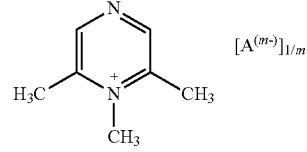
(P-1-m)

-continued

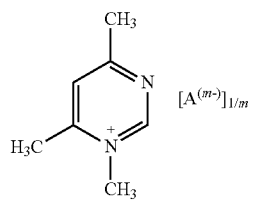
(P-1-n)

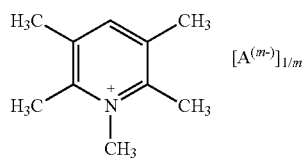
(P-1-o)

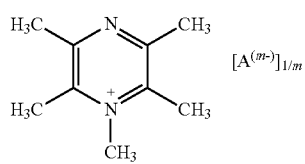
(P-1-p)

wherein A and m have the meaning as above detailed.

Preferred salts (P) of formula (P-2) are those complying with formula (P-2-a):

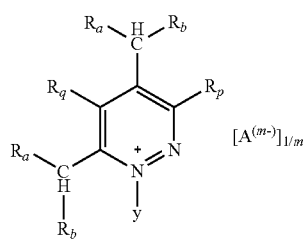
(P-2-a)

wherein:

$R_a$ and $R_b$ have the meaning as above defined, preferably $R_a$ and $R_b$ are H;

Y has the meaning as defined above, preferably Y is methyl;

each of $R_p$ and $R_q$, equal to or different from each other, is H or a $C_1$-$C_{12}$ hydrocarbon group;

A and m have the meanings as above defined.

More preferably, salts (P) of formula (P-2) are those having formula (P-2-b)

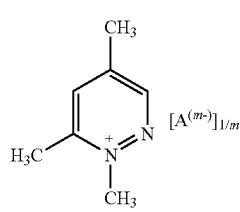
(P-2-b)

wherein A and m have the meaning as above detailed.

Preferred salts (P) of formula (P-3) are those complying with formula (P-3-a):

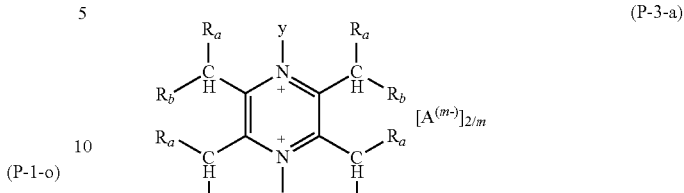
(P-3-a)

wherein:

$R_a$ and $R_b$ have the meaning as above defined, preferably $R_a$ and $R_b$ are H;

Y has the meaning as defined above, preferably Y is methyl;

A and m have the meanings as above defined.

More preferably, salts (P) of formula (P-3) are those having formula (P-3-b)

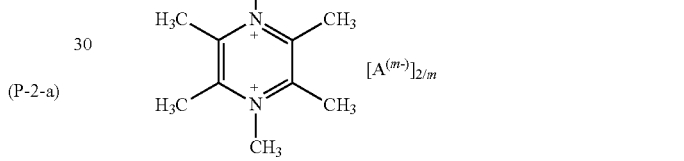
(P-3-b)

wherein A and m have the meaning as above detailed.

Preferred salts (P) of formula (P-4) are those complying with formula (P-4-a):

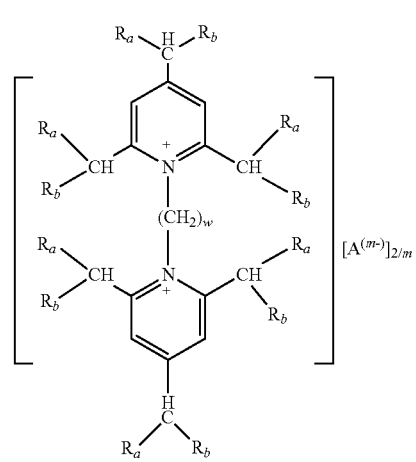
(P-4-a)

wherein:

$R_a$ and $R_b$ have the meaning as above defined, preferably $R_a$ and $R_b$ are H;

w is an integer of 1 to 12, preferably of 1 to 6, most preferably equal to 3;

A and m have the meanings as above defined.

More preferably, salts (P) of formula (P-4) are those having formula (P-4-b) or (P-4-c):

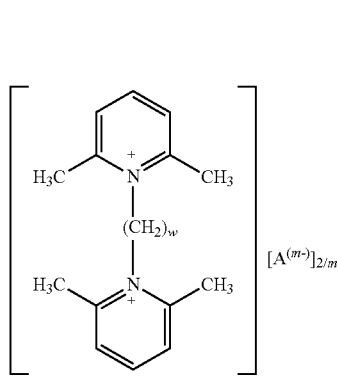
(P-4-b)

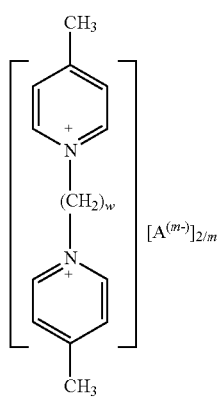
(P-4-c)

wherein A, and m have the meaning as above detailed, and w=3.

Preferred salts (P) of formula (P-5) are those complying with formula (P-5-a):

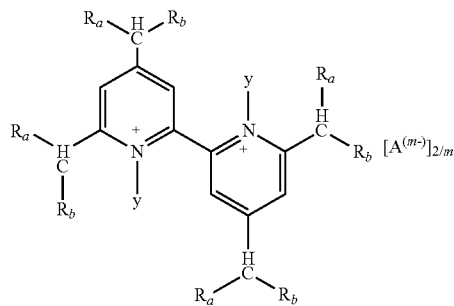
(P-5-a)

wherein:
$R_a$ and $R_b$ have the meaning as above defined, preferably $R_a$ and $R_b$ are H;
Y has the meaning as defined above, preferably Y is methyl;
A and m have the meanings as above defined.

More preferably, salts (P) of formula (P-5) are those having formula (P-5-b) or (P-5-c):

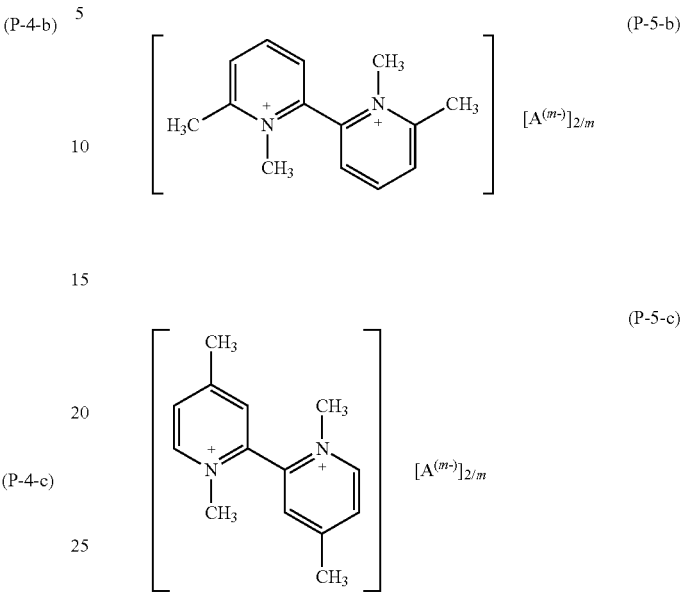
(P-5-b)

(P-5-c)

wherein A and m have the meaning as above detailed.

Preferred salts (P) of formula (P-11) are those complying with formula (P-11-a):

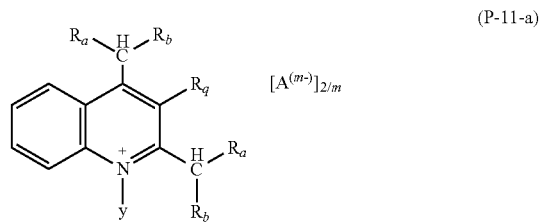
(P-11-a)

wherein:
$R_a$ and $R_b$ have the meaning as above defined, preferably $R_a$ and $R_b$ are H;
Y has the meaning as defined above, preferably Y is methyl;
A and m have the meanings as above defined.

More preferably, salts (P) of formula (P-11) are those having formula (P-11-b):

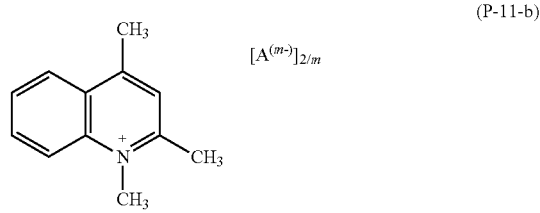
(P-11-b)

wherein A and m have the meaning as above detailed.

Preferred salts (P) of formula (P-12) are those complying with formula (P-12-a):

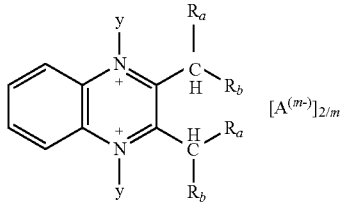 (P-12-a)

wherein:
$R_a$ and $R_b$ have the meaning as above defined, preferably $R_a$ and $R_b$ are H;
Y has the meaning as defined above, preferably Y is methyl;
A and m have the meanings as above defined.
More preferably, salts (P) of formula (P-12) are those having formula (P-12-b):

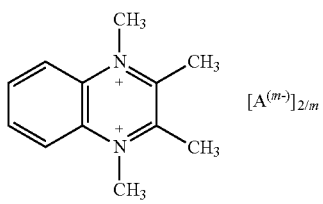 (P-12-b)

wherein A and m have the meaning as above detailed.

The choice of the anion A in formulae (P-1) to (P-12) is not particularly critical; it is nevertheless understood that anions selected from the group consisting of arylsulfonates, in particular, tosylate (p-toluensulfonate), (fluoro)alkyl sulfonates having a $C_1$-$C_6$ (fluoro)alkyl chain, including fluorine-free alkyl sulfonates e.g. mesylate (methane-sulfonate) and fluorine containing (especially perfluorinated) alkyl sulfonates, e.g. triflate (trifluoromethansulfonate); halides (iodide, bromide, chloride) are particularly preferred because of their prompt accessibility from synthetic perspective.

As a whole, exemplary compounds which have been found particular utility in the composition of the present invention are those listed below having formulae (Px-1) to (Px-9):

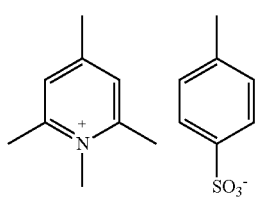 (Px-1)

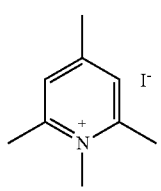 (Px-2)

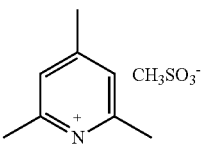 (Px-3)

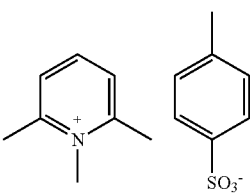 (Px-4)

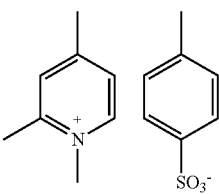 (Px-5)

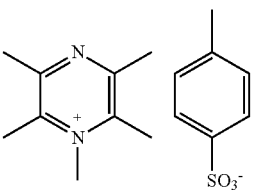 (Px-6)

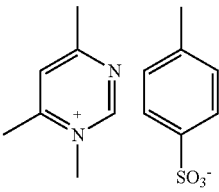 (Px-7)

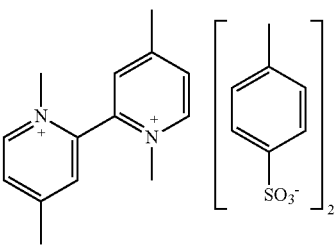 (Px-8)

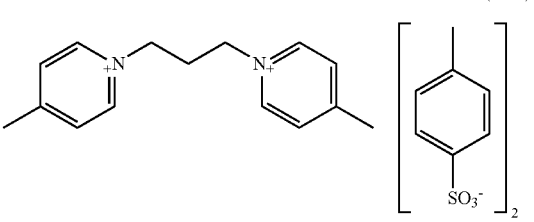 (Px-9)

On the other side, as it will become apparent from comparative data provided, compounds which fail to possess the specific structural features of ring-quaternized pyridinium salts of formula (P1) to (P11) are not effective in cross-linking of fluoroelastomers. Examples of compounds which fails to possess at least two groups in ortho or para position with respect to a ring-quaternized pyridinium-type nitrogen, hence different from salts (P), and which are ineffective, are those of formulae (Px-10c) to (Px-13c):

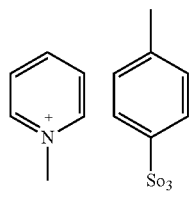
(Px-10c)

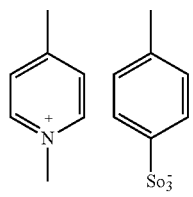
(Px-11c)

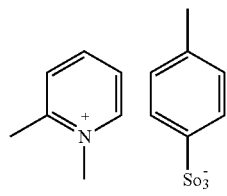
(Px-12c)

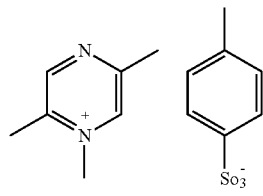
(Px-13c)

In the method of the invention, polymer (I) is reacted with an amount of salt (P) of at least 0.1, preferably at least 0.5, more preferably at least 1 weight part per 100 weight parts of polymer (I) (phr).

In the method of the invention, polymer (I) is reacted with an amount of salt (P) of at most 20, preferably at most 15, more preferably at most 10 weight parts per 100 weight parts of polymer (I).

The Base (B)

The base (B) suitable for being used in the method of the present invention is not particularly limited. One or more than one organic base, one or more than one inorganic base or mixtures of organic and inorganic base(s) (B) can be used.

Among inorganic bases [bases (IB)] mention can be notably made of:

i) divalent metal oxides, in particular oxides of alkali-earth metals or oxides of Zn, Mg, Pb, Ca, including specifically MgO, PbO and ZnO;

ii) hydroxides of metals, in particular hydroxides of monovalent and divalent metals, specifically hydroxides of alkali and alkali-earth metals, in particular hydroxides selected from the group consisting of NaOH, KOH, Ca(OH)$_2$, Sr(OH)$_2$, and Ba(OH)$_2$;

(iii) metal salts of weak acids having a pK$_a$ higher than 3, in particular weak acids selected from the group consisting of carbonates, benzoates, oxalates and phosphites; in particular Na, K, Ca, Sr, Ba salts of carbonates, benzoates, oxalates and phosphites.

Among inorganic bases, NaOH has been found to be particularly effective.

Among organic based [bases (OB)] mention can be notably made of:

(j) non-aromatic amines or amides complying with general formula (B1m) or (B1d):

(B1m)

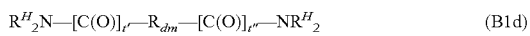
(B1d)

wherein:

each of t, t' and t", equal to or different from each other and at each occurrence is zero or 1;

each of R$^H$ is independently H or a C$_1$-C$_{12}$ hydrocarbon group;

R$_{bm}$ is a monovalent hydrocarbon non-aromatic group having 1 to 30 carbon atoms;

R$_{bm}$ is a divalent hydrocarbon non-aromatic group having 1 to 30 carbon atoms; and (jj) cycloaliphatic secondary or tertiary amines complying with general formula (B2m) or (B2d):

(B2m)

(B2d)

wherein:

Cy represents a divalent aliphatic group comprising at least 4 carbon atoms, optionally comprising one or more than one ethylenically unsaturated double bond, and optionally comprising one or more catenary nitrogen atoms, forming a cycle with the nitrogen atom which is connected thereto;

Cy' represent a trivalent aliphatic group comprising at least 5 carbon atoms, optionally comprising one or more than one ethylenically unsaturated double bond, and optionally comprising one or more catenary nitrogen atoms, forming a cycle with the nitrogen atom which is connected thereto;

(jjj) aromatic amines or amides complying with general formula (B3):

(B3)

wherein:

t, equal to or different from each other and at each occurrence, is zero or 1;

w is an integer of 1 to 4;

each of R$^H$ is independently H or a C$_1$-C$_{12}$ hydrocarbon group;

Ar$_b$ is a mono- or poly-nuclear aromatic group, possibly comprising one or more than one catenary heteroatoms selected from the group consisting of S and O;

(jv) heteroaromatic amines comprising at least one nitrogen atom comprised in a heteroaromatic cycle, in particular pyridine derivatives;

(v) guanidine derivatives of formula (B4) or (B5):

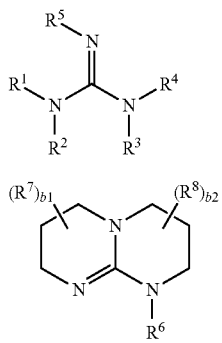

wherein:
each of $R^1$, $R^2$, $R^3$, $R^4$, $R^5$, $R^6$, $R^7$, and $R^8$, equal to or different from each other, is independently H or a $C_1$-$C_{12}$ hydrocarbon group and corresponding salts of said guanidines (B4) and (B5), in particular corresponding N-quaternized hydrohalides (preferably hydrochlorides);

(vj) metal alkoxylates, preferably alkoxylates of aliphatic alcohols.

Among bases of formulae (B1m) and (B1d), those wherein:
$R_{bm}$ is a monovalent aliphatic linear group having 6 to 30 carbon atoms, possibly comprising one or more than one ethylenically unsaturated double bond; and
$R_{dm}$ is a divalent aliphatic linear group having 6 to 30 carbon atoms, possibly comprising one or more than one ethylenically unsaturated double bond,
are particularly preferred.

Among the said non-aromatic amines or amides, mention can be particularly made of:
octadecylamine of formula $CH_3(CH_2)_{17}$—$NH_2$;
erucamide of formula $H_2N$—$C(O)$—$(CH_2)_{11}$—$CH$=$CH$—$(CH_2)_7CH_3$;
oleamide of formula $H_2N$—$C(O)$—$(CH_2)_7$—$CH$=$CH$—$(CH_2)_7CH_3$;
hexamethylenediamine of formula $H_2N$—$(CH_2)_6$—$NH_2$;
N,N-dimethyloctylamine;
N,N-dimethyldodecylamine;
triethylamine;
trioctylamine;
trihexylamine.

Among the said cycloaliphatic secondary or tertiary amines, mention can be made of 1,8-diazabicycloundec-7-ene (DBU) of formula:

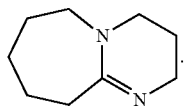

Exemplary embodiments of said guanidine derivatives of formula (B-4) are notably guanidine hydrochloride and di-o-tolylguanidine.

Exemplary embodiments of said metal alkoxylates are notably potassium terbutylate, sodium ethylate and sodium methylate.

Exemplary embodiments of said heteroaromatic amines are notably trimethylpyridine isomers.

The amount of base (B) will be adjusted by one of ordinary skills in the art, taking into account the nature and basicity of base (B) used.

It is nevertheless understood that in the method of the invention use is made of an amount of base (B) of at least 3 parts, preferably 5 parts per 100 weight parts of polymer (I). Upper boundaries for the amount of base (B) will be optimized for avoiding loading the resulting compound with excessive amounts of base (B); nonetheless, amounts of base (B) of at most 20 parts, preferably at most 15 parts, most preferably at most 12 parts per 100 weight parts of polymer (I) are generally recommended.

In the method of the present invention, the base (B) and the salt (P) may be mixed before being contacted with polymer (I) in a preliminary step, so as to generate corresponding carbanion of the salt (P).

Generally, when base (B) and salt (P) are mixed in a preliminary step, the said preliminary step occurs in an aqueous medium, i.e. in a liquid medium which comprises water as major component.

Reacting Polymer (I), Base (B) and Salt (P)

In the method of the present invention, polymer (I), base (B) and salt (P) are reacted together.

The reaction between polymer (I), base (B) and salt (P) can be carried out in solid phase, in molten phase or in a liquid phase.

Mixing polymer (I), base (B) and salt (P) in solid phase and heating at appropriate temperature is effective in generating cross-linking.

It is generally understood that reaction in solid phase will proceed with faster kinetics when polymer (I), base (B) and salt (P) are heated at temperatures of at least 50° C., preferably at least 60° C., more preferably at least 70° C. Temperatures of more than 150° C. may be applied to solid phase mixture for achieving fast and complete crosslinking.

Reactions in the molten phase or in a liquid phase are equally effective for providing cross-linked polymer.

Reacting "in the molten phase" polymer (I), base (B) and salt (P) is hereby understood to mean that base (B) and salt (P) are reacted with polymer (I) with this latter being in the molten state.

This reaction can be carried out in any suitable mixing device, including static mixers and extruders, at temperatures exceeding the melting point of polymer (I).

Reacting "in a liquid phase" polymer (I), base (B) and salt (P) is hereby understood to mean that base (B) and salt (P) are comprised in a liquid phase, which is contacted and reacted with polymer (I); polymer (I) may be present in the said liquid phase in dissolved form (i.e. forming a "true" solution in the liquid phase), in dispersed form (i.e. under the form of stably dispersed colloidal particles), or in solid/suspended form (i.e. under solid form in the liquid phase, e.g. as a film/sheet immersed in the said liquid phase).

Generally, the preferred liquid phase enabling reacting polymer (I), base (B) and salt (P) comprises water as major component.

While minor amounts of organic solvents may be present, it is generally understood that the liquid phase essentially consists of water, and that solvents are present preferably in limited amounts, e.g. of less than 1% wt, with respect to the total weight of the liquid phase, so as not to disadvantageously modify the aqueous nature thereof.

When reacting in a liquid phase polymer (I), base (B) and salt (P), the temperature is generally comprised from 10 to 90° C., preferably from 20 to 85° C.

In the method of the invention, at least a fraction of —SO$_2$F groups of polymer (I) are reacted with base (B) and salt (P) to yield cross-linked polymer.

One of ordinary skills in the art will be able to select the most appropriate conditions for ensuring effectiveness of cross-linking through reaction between polymer (I), base (B) and salt (P).

Yet, in certain embodiment's of the method of the invention, at least a fraction of the —SO$_2$F groups of polymer (I) will not react with base (B) and salt (P), and will remain unreacted in the cross-linked polymer resulting therefrom.

Adding an amount of salt (P) in defect with respect to the equivalents of —SO$_2$F groups of polymer (I) is an embodiment which will ensure that the method of manufacturing the cross-linked polymer of the invention will result in a cross-linked polymer (XPL) comprising (residual) —SO$_2$X groups, with X being F or Cl.

The method of the invention may further include a step of hydrolysing at least a fraction of —SO$_2$X groups of polymer (I) or of polymer (XPL) (i.e. at least a fraction of the residual, unreacted —SO$_2$X groups) so as to provide corresponding —SO$_3$M groups, with M being H or a cation (e.g. a metal cation or an ammonium cation).

Hydrolysis of a fraction of —SO$_2$X groups may occur simultaneously with reacting another fraction of —SO$_2$X groups of polymer (I) with base (B) and salt (P) or may occur afterwards on the cross-linked polymer (XPL), this polymer (XPL) comprising —SO$_2$X groups which have not reacted with base (B) and salt (P).

Hydrolysis of a fraction of —SO$_2$X groups of polymer (I) or polymer (XPL) may be notably achieved by reaction with base (B) as above detailed, by addition of an amount of base (B) exceeding the stoichiometric amount required for creating carbanions of salt (P) as above detailed.

As an alternative, a further amount of base (B) or of a base different from base (B) may be added once reaction between polymer (I), base (B) and salt (P) is completed.

When the method of the invention comprises a step of hydrolysing a fraction of —SO$_2$X groups of polymer (I) or polymer (XPL), the cross-linked polymer (XPL) is generally retrieved as a material including cross-linked —SO$_2$— groups and —SO$_3$H groups.

The Cross-Linked Polymer

As said, as an outcome of the reaction between polymer (I), base (B) and salt (P), a cross-linked polymer [polymer (XLP)] is obtained.

The polymer (XLP) is another object of the present invention.

The cross-linked polymer (XLP) comprises polymer chains covalently bound one to the other through a bridging group of formula (XPL):

—SO$_2$—C(R$_a$)(R$_b$)-py-C(R$_a$)(R$_b$)—SO$_2$—    formula (XPL)

wherein:
R$_a$ and R$_b$, equal to or different from each other, are independently H or a hydrocarbon C$_1$-C$_6$ group;
py is a group of any of formulae (P$_{XPL}$-1) to (P$_{XPL}$-12) herein below:

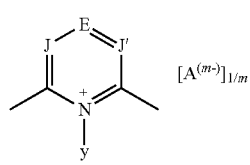
(P$_{XPL}$-1)

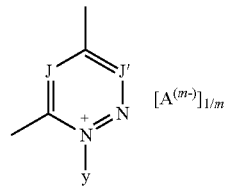
(P$_{XPL}$-2)

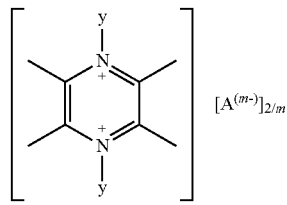
(P$_{XPL}$-3)

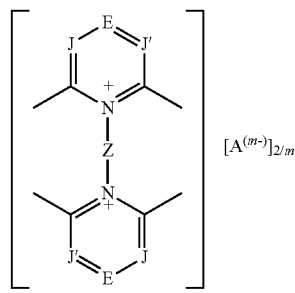
(P$_{XPL}$-4)

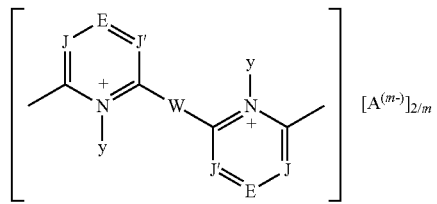
(P$_{XPL}$-5)

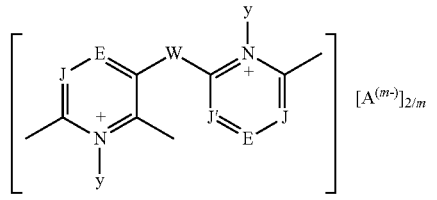
(P$_{XPL}$-6)

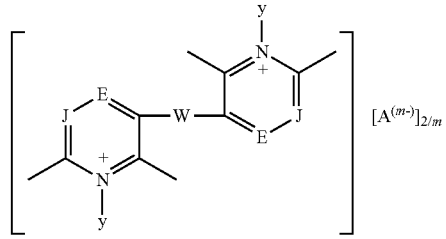
(P$_{XPL}$-7)

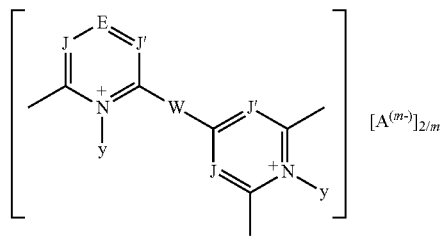
(P$_{XPL}$-8)

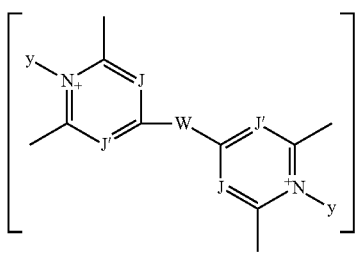 (P$_{XPL}$-9)

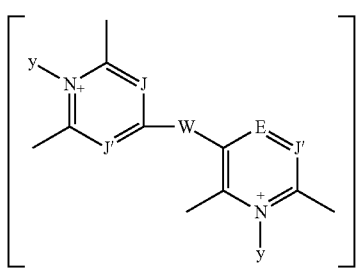 (P$_{XPL}$-10)

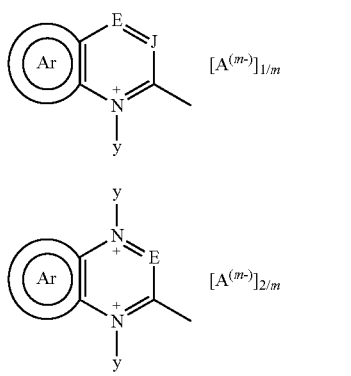 (P$_{XPL}$-11)

(P$_{XPL}$-12)

wherein:
each of J and J', equal to or different from each other, is independently at each occurrence C—R* or N, wherein R* is H or a $C_1$-$C_{12}$ hydrocarbon group;
E is N or a C atom bearing a free bond C—;
Z is a divalent hydrocarbon group comprising from 1 to 12 carbon atoms;
W is a bond or is a bridging group selected from the group consisting of divalent hydrocarbon groups comprising from 1 to 12 carbon atoms (preferably divalent aliphatic groups comprising from 1 to 6 carbon atoms) and divalent fluorocarbon groups comprising from 1 to 12 carbon atoms (preferably divalent perfluoroaliphatic groups comprising from 1 to 6 carbon atoms);
the group sketched with symbol:

in formula (P$_{XPL}$-11) and (P$_{XPL}$-12) designates an aromatic mono- or poly-nuclear ring condensed to the pyridinium-type aromatic ring, which may comprise one or more additional nitrogen atoms, optionally quaternized nitrogen atoms, in the ring(s); and
in each of formulae (P$_{XPL}$-1) to (P$_{XPL}$-12), including groups E, where appropriate, the free bonds are either covalently bound to —C(R$_a$)(R$_b$)—SO$_2$— groups of formula (XPL), or are covalently bound to —H or to a group of formula [group (alpha-H)]:

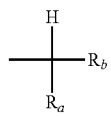

wherein R$_a$, and R$_b$, equal to or different from each other, are independently H or a hydrocarbon $C_1$-$C_6$ group; with the provisio that at least two free bonds are covalently bound to —C(R$_a$)(R$_b$)—SO$_2$— groups of formula (XPL).

Further, in addition, polymer (XPL) may comprise —SO$_2$X groups, with X being F or Cl, or may comprise —SO$_3$M groups, with M being H or a cation (e.g. a metal cation or an ammonium cation).

When the method comprises reacting polymer (I), base (B) and salt (P) in a liquid phase, wherein polymer (I) is in dissolved form or in dispersed form, the polymer (XPL) is obtained in the form of a liquid composition. Liquid phase has all the features disclosed above.

Any conventional method known in the art, such as impregnation, casting, coating, e.g. roller coating, gravure coating, reverse roll coating, dip coating, spray coating and the like may be used to obtain shaped articles from a liquid composition comprising polymer (XPL) in dissolved or dispersed form, as above detailed.

The liquid composition comprising polymer (XPL) may be cast over an inert, non porous, support in a film-forming layer which, typically after a drying step, is removed from the support providing an article, typically in the form of a film, consisting of the cross-linked polymer (XPL). Common supports are for instance a plate, a belt or a fabric, made of glass, metal or polymeric material from which the film of the cross-linked polymer (XPL) may be removed.

Alternatively, the liquid composition comprising polymer (XPL) may be used for the preparation of composite articles, that is articles comprising a support, preferably a porous support, in addition to the cross-linked fluorinated polymer. Notable examples of composite articles are for instance composite membranes, fabrics, fibres. Composite membranes can be used both as ion conducting membranes in electrolytic cells or as membranes for filtration or ultrafiltration applications.

Said composite articles may be prepared by casting or coating the liquid composition comprising polymer (XPL) over a suitable porous support. Alternatively they may be prepared with the liquid composition comprising polymer (XPL) with an impregnation process.

Such an impregnation process comprises the step of impregnating a porous support with the liquid composition comprising polymer (XPL).

The choice of the porous support is not particularly limited. Porous supports which are generally inert at the conditions of use of the composite article will generally be preferred.

Among porous inert materials suitable for the preparation of the composite article mention can be made of fabrics, fibers, inorganic materials, woven or non-woven polyolefin membranes, and fluorinated polymer porous supports.

When the article is an ion conducting or filtration membrane, porous supports of fluorinated polymers are generally preferred because of their high chemical inertia. Biaxially expanded PTFE porous supports (otherwise known as ePTFE membranes) are among preferred supports. These supports are notably commercially available under trade names GORE-TEX®, TETRATEX®.

Impregnation can be carried out by immersion of the porous support into an impregnation vessel comprising the liquid composition or it can be performed by applying suitable amounts of the same by well-known coating techniques such as casting, coating, spraying, brushing and the like, either simultaneously on each side of the porous support or in subsequent coating steps. It is nevertheless generally understood that impregnation by immersion in a vessel comprising the liquid composition is the technique having provided best results.

When the method comprises reacting polymer (I), base (B) and salt (P) in a liquid phase, wherein polymer (I) is in solid form in the liquid phase, preferably as an essentially bi-dimensional shaped article immersed in the said liquid phase, the polymer (XPL) is obtained in the form of an essentially bi-dimensional shaped article, which may be used as a membrane.

Should the disclosure of any of the patents, patent applications, and publications that are incorporated herein by reference conflict with the present description to the extent that it might render a term unclear, the present description shall take precedence.

The invention will be now described with reference to the following examples, whose purpose is merely illustrative and not intended to limit the scope of the invention.

EXAMPLES

Preparative Example 1—1,2,4,6-tetramethyl-pyridinium p-toluenesulphonate of formula (Px-1)

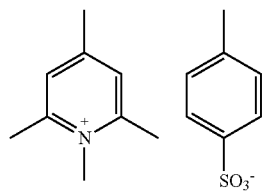

(Px-1)

A three-necked round bottom flask equipped with thermometer, condenser and stirring was charged with $CH_2Cl_2$ (85 ml) and methyl-p-toluenesulphonate (25.50 g). Then 2,4,6 trimethylpyridine (16.59 g) was added drop-wise at room temperature. The reaction was stirred at 50° C. and, after 22 hours, it was completed. The liquid phase was removed by evaporation under vacuum obtaining a white powder that was dispersed in diethyl-ether (50 ml) under stirring. The liquid phase was filtered off and 39.13 g of pure product was recovered as a white powder in 93% yield (melting point 161° C.; 1% weight loss: 266° C.).

$^1$H NMR (solvent $D_2O$, TMS reference): +7.70 ppm (d; 2H; ortho-H; p-toluenesulphonate); +7.55 (s; 2H; meta-H; 1,2,4,6-tetramethyl-pyridinium); +7.39 (d; $^2$H; meta-H; p-toluenesulphonate); +4.0 (s; 3H; NCH$_3$; 1,2,4,6-tetramethyl-pyridinium); +2.74 (s; 6H; ortho-CH3; 1,2,4,6-tetramethyl-pyridinium); 2.53 (s; 3H; para-CH$_3$; 1,2,4,6-tetramethyl-pyridinium); +2.44 ppm (s; 3H; para-CH$_3$; p-toluenesulphonate).

Preparative Example 2—1,2,6-trimethyl-pyridinium p-toluenesulphonate of formula (Px-4)

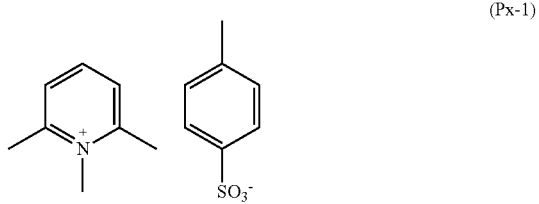

(Px-1)

A three-necked round bottom flask equipped with thermometer, condenser and stirring was charged with $CH_2Cl_2$ (163 ml) and methyl-p-toluenesulphonate (52.14 g). Then 2,6 dimethylpyridine (30 g) was added drop-wise at room temperature. The reaction was stirred at 50° C. and, after 23 hours, it was completed. The liquid phase was removed by evaporation under vacuum obtaining a white powder that was dispersed in diethyl-ether (200 ml) under stirring. The liquid phase was filtered off and 58.06 g of pure product was recovered as a white powder in 71% yield (melting point 157.6° C.; 1% weight loss: 256° C.).

$^1$H NMR (solvent $D_2O$, TMS reference): +8.14 ppm (t; 1H; para-H; 1,2,6-trimethyl-pyridinium); +7.66 ppm (m; 4H; ortho-H; p-toluenesulphonate and meta-H; 1,2,6-trimethyl-pyridinium); +7.33 (d; 2H; meta-H; p-toluenesulphonate); +4.00 (s; 3H; NCH$_3$; 1,2,6-trimethyl-pyridinium); +2.74 (s; 6H; ortho-CH$_3$; 1,2,6-trimethyl-pyridinium); +2.38 ppm (s; 3H; para-CH$_3$; p-toluenesulphonate).

Preparative Example 3—1,1',4,4'-tetramethyl-2,2'-dipyridinium p-toluenesulphonate of Formula (Px-8)

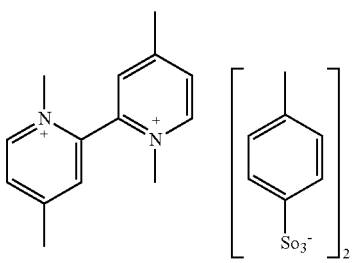

(Px-8)

A three-necked round bottom flask equipped with thermometer, condenser and stirring was charged with $CH_3CN$ (15 ml) and methyl-p-toluenesulphonate (9.03 g). Then 4,4'-dimethyl-2,2'-dipyridyl (2.50 g) was added drop-wise at room temperature. The reaction was stirred at 85° C. and, after 20 hours, it was completed. The liquid phase was removed by evaporation under vacuum obtaining a pale pink powder that was dispersed in $CH_2Cl_2$ (50 ml) under stirring. The liquid phase was filtered off and 7.05 g of pure product was recovered as a white powder in 93% yield (melting point 216.03° C. dec.; 1% weight loss: 216.03° C.).

$^1$H NMR (solvent $D_2O$, TMS reference): +8.94 ppm (m; 2H; ortho-H; 1,1',4,4'-tetramethyl-2,2'-dipyridinium); +8.12 ppm (m; 4H; meta-H; 1,1',4,4'-tetramethyl-2,2'-dipyridinium); +7.66 ppm (d; 4H; ortho-H; p-toluenesulphonate);

+7.36 (d; 4H; meta-H; p-toluenesulphonate); +4.10 (s; 6H; NCH$_3$; 1,1',4,4'-tetramethyl-2,2'-dipyridinium); +2.74 (s; 6H; para-CH3; 1,1',4,4'-tetramethyl-2,2'-dipyridinium); +2.40 ppm (s; 6H; para-CH$_3$; p-toluenesulphonate).

Preparative Example 4 of Comparison—1,4-dimethyl-pyridinium p-toluenesulphonate of formula (Px-11c)

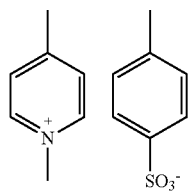

(Px-11c)

A three-necked round bottom flask equipped with thermometer, condenser and stirring was charged with CH$_2$Cl$_2$ (85 ml) and methyl-p-toluenesulphonate (44 g). Then 4-methyl-pyridine (20 g) was added drop-wise at room temperature. The reaction was stirred at 50° C. and, after 24 hours, it was completed. The liquid phase was removed by evaporation under vacuum obtaining a white powder that was dispersed in diethyl-ether (150 ml) under stirring. The liquid phase was filtered off and 58 g of pure product was recovered as a white powder in 96.7% yield (melting point 154° C.; 1% weight loss: 280° C.).

$^1$H NMR (solvent D$_2$O, TMS reference): +8.52 ppm (d; 2H; ortho-H; 1,4-dimethyl-pyridinium); +7.80 ppm (d; 2H; meta-H; 1,4-dimethyl-pyridinium); +7.67 ppm (d; 2H; ortho-H; p-toluenesulphonate); +7.36 ppm (d; 2H; meta-H; p-toluenesulphonate); +4.27 ppm (s; 3H; NCH$_3$; 1,4-dimethyl-pyridinium); +2.62 ppm (s; 3H; para-CH$_3$; 1,4-dimethyl-pyridinium); +2.40 ppm (s; 3H; para-CH$_3$; p-toluenesulphonate).

Preparative Example 5: Preparation of TFE-SFVE Copolymer (Herein after Ionomer-1)

In a 5 liter autoclave the following reagents were charged:
2.6 liter of demineralized water;
145 g of the monomer with formula CF$_2$=CF—O—CF$_2$CF$_2$—SO$_2$F (SFVE);
720 g of a 5 wt % aqueous solution of CF$_2$ClO(CF$_2$CF(CF$_3$)O)$_n$(CF$_2$O)$_m$ CF$_2$COOK (averaged M$_W$=521, n/m ratio=10).

The autoclave, stirred at 650 rpm, was heated at 55° C. A water solution with 27 g/L of potassium persulfate was added in an amount of 66 mL for initiating reaction. The pressure was then maintained at a set-point value of 8 bar (abs.) by feeding tetrafluoroethylene (TFE).

Once 40 g of tetrafluoroethylene were consumed in the reactor, 40 g of the monomer SFVE were added every 40 g of TFE fed to the autoclave.

The reaction was stopped after 300 min by interrupting the stirring, cooling the autoclave and reducing the internal pressure by venting TFE; total amount of TFE fed to the reactor was 800 g.

The latex was then coagulated by freezing and thawing and the recovered polymer was washed with water and dried at 80° C. for 48 h.

Equivalent weight (EW) of the polymer was determined by FTIR according to known methods and found to be 671 g/mol.

Preparative Example 6: Preparation of TFE-MVE-SFVE Terpolymer (Hereinafter FFKM-1)

In a 5 litres reactor equipped with a mechanical stirrer operating at 630 rpm, 3.1 l of demineralized water and 31 ml of a microemulsion, previously obtained by mixing 7.4 ml of a perfluoropolyoxyalkylene having acidic end groups of formula: CF$_2$ClO(CF$_2$—CF(CF$_3$)O)$_n$(CF$_2$O)$_m$CF$_2$COOH, wherein n/m=10, having average molecular weight of 600, 1.9 ml of a 30% v/v NH$_4$OH aqueous solution, 17.4 ml of demineralised water and 4.3 ml of GALDEN® D02 perfluoropolyether of formula: CF$_3$O(CF$_2$CF(CF$_3$)O)$_n$(CF$_2$O)$_m$CF$_3$ with n/m=20, having average molecular weight of 450, were introduced.

Then 2.5 g of 1,4-diiodoperfluorobutane (C$_4$F$_8$I$_2$) as chain transfer agent were introduced, and the reactor was heated and maintained at a set-point temperature of 80° C.; 3.2 g of SFVE and a mixture of tetrafluoroethylene (TFE) (33.2% moles) and perfluoromethylvinylether (MVE) (66.8% moles) were then added to reach a final pressure of 21 bar (2.1 MPa). 1.55 g of ammonium persulfate (APS) as initiator were then introduced. Pressure was maintained at set-point of 21 bar by continuous feeding of a gaseous mixture of TFE (57.5% moles) and MVE (42.5% moles) up to a total of 1350 g, and 61.6 g of SFVE in 20 portions, each 5% increase in conversion, starting from the beginning of the polymerization, were fed to the reactor. Then the reactor was cooled, vented and the latex recovered. The latex was coagulated with nitric acid as a coagulation agent, and the polymer separated from the aqueous phase, washed with demineralised water and dried in a convection oven at 120° C. for 24 hours.

The composition of the obtained polymer from NMR analysis was found to be as follows: TFE 59.8% mol, MVE 38.8% mol, SFVE 1.4% mol, and the Mooney viscosity at 121° C. was found to be 53 MU.

Preparative Example 7: Preparation of TFE-MVE-SFVE Terpolymer (Hereinafter FFKM-2)

The procedure detailed under Preparative Example 6 was repeated except that no 1,4-diiodoperfluorobutane (C$_4$F$_8$I$_2$) was introduced in the reactor, and a mixture of TFE (33.2% moles), MVE (66.0% moles) and ethylene (E) (0.8% moles) was added to reach the pressure of 21 bar (2.1 MPa). The composition of the obtained polymer from NMR analysis was found to be as follows: TFE 59.7% mol, MVE 38.8% mol, VEFS 1.5% mol, and the Mooney viscosity at 121° C. was found to be 51 MU.

Crosslinking of Films

Example 8: Crosslinking of a Film of Ionomer 1 with Pyridinium Salt of Formula (Px-4)

8.1 Preparation of a Film from Ionomer 1

An amount equal to 10 g of the TFE-SFVE copolymer obtained as detailed in Preparative Example 5 (Ionomer-1) was heated at 200° C. for 10 min while compressed between the plates of a hot press without applying pressure, then degassed (1 min, 200° C. shifting the pressure from 1 barA to 3 barA every 10 s) and eventually pressed at the same temperature, pressure of 2 barA for 10 min. After cooling, a membrane having an average thickness of 150 μm was obtained.

8.2 Crosslinking of the Film 2.4 g of pyridinium salt of formula (Px-4) prepared as detailed in Preparative Example 2 was dissolved under stirring at room temperature in a glass vessel containing demineralized water (50 g); then NaOH (0.7 g) was slowly added to this solution and the temperature was raised to 80° C. After 2 h, a specimen of the film obtained as detailed above (4.7 g) was dipped for 8 h at 80° C. and then it was carefully rinsed in demineralized water, washed with diluted HNO$_3$, demineralized water and dried in a vent oven at 100° C. for 8 h.

Comparative Example 9C: Reaction of a Film of Ionomer 1 with Pyridinium Salt of Formula (Px-11c)

Same procedure was repeated but using 2.3 g of the pyridinium salt of formula (Px-11c) obtained as detailed in Preparative Example 4, and contacting the same with a specimen of same film but having a weight of 4.5 g.

Characterizations of the Films

FT-IR Spectroscopy

The presence of pyridinium salt in the polymer structure in the films was verified through FT-IR spectroscopy. In film obtained from Example 8, the presence of bands at 1600 and 1650 cm$^{-1}$ attributable to the aromatic C—H bonds in the IR spectrum was detected, showing that chemically bound pyridinium-type moieties were included in the polymer structure.

Stress-Strain Determination of Tensile Properties

Tensile properties of native film of Ionomer-1, prepared as detailed under subsection 8.1, of film of cross-linked polymer from Example 8, as recovered pursuant to sub-section 8.2, and of film of comparison as obtained from Example 9C were determined according to ASTM D 633 Type V.

Data are summarized in the following Table:

TABLE 2

| Tensile Properties | Reference | Ex. 8 | Ex. 9C |
|---|---|---|---|
| Elastic Modulus (MPa) | 45 | 104 | 64 |

Data summarized above well demonstrate that cross-linking with pyridium salt possessing at least two reactive hydrogen atoms, as in Ex. 8, is effective in substantially improving mechanical properties with respect to reference material, prior to cross-linking. Reaction with "mono-" substituted pyridinium salt of comparison is not effective in such improvement, showing that no three-dimensional network is achieved, but solely hydrolysis, known for slightly increasing mechanical performances.

Example 11—Preparation of Compound of FFKM-1, Salt (P) of Formula (Px-1) and MgO Pyridinium salt of formula (Px-1), prepared as detailed in Preparative Example 1 (1.83 parts per weight), Magnesium oxide (7 parts per weight) were added to 100 parts by weight of FFKM-1 and the mixture was kneaded on a two rolls mill.

Example 12—Preparation of Compound of FFKM-2, Salt (P) of Formula (Px-1) and MgO Pyridinium salt of formula (Px-1), prepared as detailed in Preparative Example 1 (1.83 parts per weight), Magnesium oxide (7 parts per weight) were added to 100 parts by weight of FFKM-2 and the mixture was kneaded on a two rolls mill.

Example 13 Preparation of Compound of FFKM-1, Salt (P) of Formula (Px-4) and MgO Pyridinium salt of formula (Px-4), prepared as detailed in Preparative Example 2 (2.33 parts per weight), Magnesium oxide (7 parts per weight) were added to 100 parts by weight of FFKM-1 and the mixture was kneaded on a two rolls mill.

Example 14

Pyridinium salt of salt of formula (Px-4), prepared as detailed in Preparative Example 2 (2.33 parts per weight), Magnesium oxide (7 parts per weight) were added to 100 parts by weight of FFKM-2 and the mixture was kneaded on a two rolls mill.

Characterization of cure behaviour of perfluoroelastomers (Ex 11-Ex 14) Cure behaviour was characterized by Moving Die Rheometer (MDR), at 170° C., by determining the following properties:
M$_L$=Minimum torque (lb×in)
M$_H$=Maximum torque (lb×in)
ΔM=M$_H$–M$_L$ (lb×in).
Perfluoroelastomer cure results are depicted in Table 1

TABLE 1

|  | EX 11 | EX 12 | EX 13 | EX 14 |
|---|---|---|---|---|
|  | MDR 170° C. | | | |
| M$_L$ (lb*in) | 0.4 | 0.4 | 0.4 | 0.4 |
| M$_H$ (lb*in) | 4.1 | 4.3 | 3.8 | 3.9 |

MDR data, as shown above, clearly demonstrate, through the significant increase in torque value, the actual crosslinking achieved through the use of pyridinium salts in combination with fluoroelastomers comprising —SO$_2$F groups.

The invention claimed is:
1. A method for manufacturing a cross-linked polymer (XPL), said method comprising reacting:
at least one polymer (I) wherein polymer (I) is a polymer comprising at least one —SO$_2$X group, with X being F or Cl;
at least one base (B), wherein base (B) is at least one basic compound;
at least one pyridinium salt (P) complying with any of formulae (P-1) to (P-12):

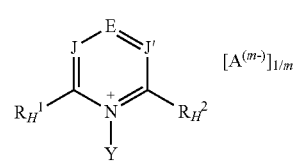

(P-1)

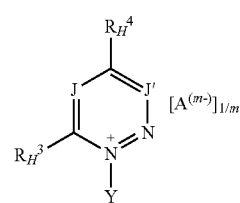

(P-2)

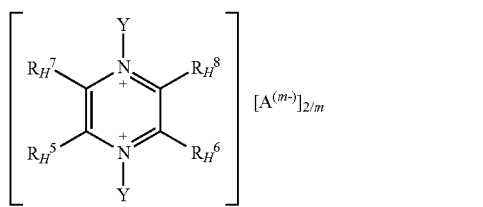
(P-3)

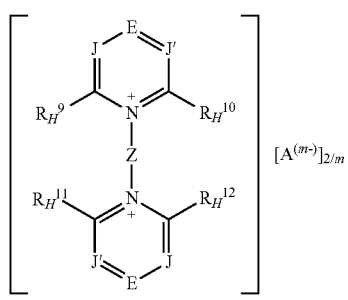
(P-4)

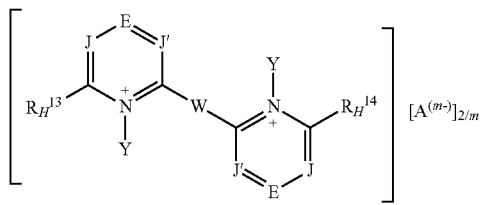
(P-5)

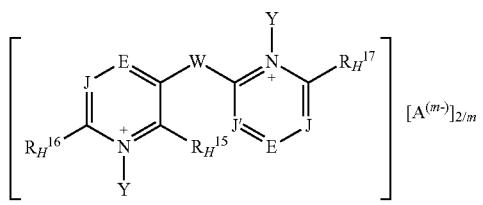
(P-6)

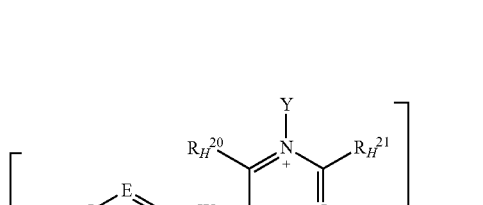
(P-7)

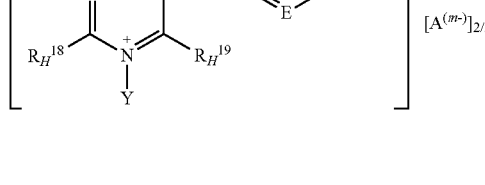
(P-8)

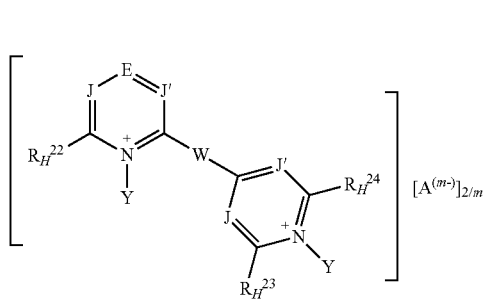

(P-9)

(P-10)

(P-11)

(P-12)

wherein:
each of J and J', equal to or different from each other, is independently at each occurrence C—R* or N, wherein R* is H or a $C_1$-$C_{12}$ hydrocarbon group;
E is N or a group of formula C—R°H;
Z is a divalent hydrocarbon group comprising from 1 to 12 carbon atoms;
W is a bond or is a bridging group selected from the group consisting of divalent hydrocarbon groups comprising from 1 to 12 carbon atoms and divalent fluorocarbon groups comprising from 1 to 12 carbon atoms;
the group sketched with symbol:

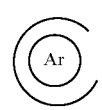

in formula (P-11) and (P-12) designates an aromatic mono- or poly-nuclear ring condensed to the pyridinium-type aromatic ring, which may comprise one or more additional nitrogen atoms, optionally quaternized nitrogen atoms, in the ring(s);
each of $R^1_H$, $R^2_H$, $R^3_H$, $R^4_H$, $R^5_H$, $R^6_H$, $R^7_H$, $R^8_H$, $R^9_H$, $R^{10}_H$, $R^{11}_H$, $R^{12}_H$, $R^{13}_H$, $R^{14}_H$, $R^{15}_H$, $R^{16}_H$, $R^{17}_H$, $R^{18}_H$, $R^{19}{}_H$, $R^{20}{}_H$, $R^{21}{}_H$, $R^{22}{}_H$, $R^{23}{}_H$, $R^{24}{}_H$, $R^{25}{}_H$, $R^{26}{}_H$, $R^{27}{}_H$, $R^{28}{}_H$, $R^{29}{}_H$, $R^{30}{}_H$, $R^{31}{}_H$, $R^{32}{}_H$, $R^{33}{}_H$, $R^{34}{}_H$, $R^{35}{}_H$, $R^{36}{}_H$, $R^o{}_H$, equal to or different from each other, is independently at each occurrence —H or group (alpha-H), wherein group (alpha-H) is a group of formula:

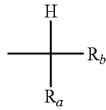

wherein $R_a$, and $R_b$ equal to or different from each other, are independently H or a hydrocarbon $C_1$-$C_6$ group;

Y, equal to or different from each other, is independently oxygen or a $C_1$-$C_{12}$ hydrocarbon group, optionally comprising one or more than one heteroatoms selected from N, O, S and halogens;

$A^{(m-)}$ is an anion having valency m; with the provisio that (i) when salt (P) is of formula (P-1) at least two of $R^1x$, $R^2{}_H$, and $R^o{}_H$ are groups (alpha-H);

(ii) when salt (P) is of formula (P-2) $R^3{}_H$ and $R^4{}_H$ are groups (alpha-H);

(iii) when salt (P) is of formula (P-3), at least two of $R^5{}_H$, $R^6{}_H$, $R^7{}_H$, and $R^8{}_H$ are groups (alpha-H);

(iv) when salt (P) is of formula (P-4), at least two of $R^9{}_H$, $R^{10}{}_H$, $R^{11}{}_H$, $R^{12}{}_H$, and $R^o{}_H$ are groups (alpha-H);

(v) when salt (P) is of formula (P-5), at least two of $R^{13}{}_H$, $R^{14}{}_H$, and $R^o{}_H$ are groups (alpha-H);

(vi) when salt (P) is of formula (P-6), at least two of $R^{15}{}_H$, $R^{16}{}_H$, $R^{17}{}_H$, and $R^o{}_H$ are groups (alpha-H);

(vii) when salt (P) is of formula (P-7), at least two of $R^{18}{}_H$, $R^{19}{}_H$, $R^{20}{}_H$, $R^{21}{}_H$, and $R^o{}_H$ are groups (alpha-H);

(viii) when salt (P) is of formula (P-8), at least two of $R^{22}{}_H$, $R^{23}{}_H$, $R^{24}{}_H$, and $R^o{}_H$ are groups (alpha-H);

(ix) when salt (P) is of formula (P-9), at least two of $R^{25}{}_H$, $R^{26}{}_H$, $R^{27}{}_H$, and $R^{28}{}_H$ are groups (alpha-H);

(x) when salt (P) is of formula (P-10), at least two of $R^{29}{}_H$, $R^{30}{}_H$, $R^{31}{}_H$, $R^{32}{}_H$, and $R^{28}{}_H$ are groups (alpha-H);

(xi) when salt (P) is of formula (P-11), at least two of $R^{33}{}_H$, $R^{34}{}_H$, and $R^{28}{}_H$ are groups (alpha-H);

(xii) when salt (P) is of formula (P-12), at least two of $R^{35}{}_H$, $R^{36}{}_H$ and $R^o{}_H$ are groups (alpha-H);

wherein reacting the at least one polymer (I), at least one base (B), and at least one pyridinium salt (P) reacts at the at least one —$SO_2X$ group and the at least one pyridinium salt, thereby resulting in formation of a bridging group.

2. The method of claim 1, wherein the amount of said —$SO_2X$ groups in polymer (I) is at least 0.01 meq/g.

3. The method of claim 2, wherein the amount of said —$SO_2X$ groups in polymer (I) is at least 0.1 meq/g.

4. The method of claim 1, wherein polymer (I) is selected from the group consisting of polymers comprising recurring units derived from at least one monomer (A) wherein monomer (A) is at least one ethylenically unsaturated fluorinated monomer containing at least one —$SO_2X$ group, with X being F or Cl; and recurring units derived from at least one monomer (B) wherein monomer (B) is at least one ethylenically unsaturated fluorinated monomer free from —$SO_2X$ group.

5. The method of claim 4, wherein monomer (A) is selected from the group consisting of:
sulfonyl halide fluoroolefins of formula: $CF_2$=CF$(CF_2)_pSO_2X$, with X being F or Cl, wherein p is an integer between 0 and 10;
sulfonyl halide fluorovinylethers of formula: $CF_2$=CF—O—$(CF_2)_mSO_2X$, with X being F or Cl, wherein m is an integer between 1 and 10;
sulfonyl fluoride fluoroalkoxyvinylethers of formula: $CF_2$=CF—(OCF$_2$CF($R_{F1}$))$_w$—O—CF$_2$(CF(RF$_2$))$_y$SO$_2$X with X being F or Cl, wherein w is an integer between 0 and 2, $R_{F1}$ and $R_{F2}$, equal or different from each other, are independently F, Cl or a $C_1$-$C_{10}$ fluoroalkyl group, optionally substituted with one or more ether oxygens, and y is an integer between 0 and 6; and
sulfonyl halide aromatic fluoroolefins of formula $CF_2$=CF—Ar—$SO_2X$ with X being F or Cl, wherein Ar is a $C_5$-$C_{15}$ aromatic or heteroaromatic group;
and/or wherein monomer (B) is selected from the group consisting of:
$C_2$-$C_8$ perfluoroolefins;
$C_2$-$C_8$ hydrogen-containing fluoroolefins;
$C_2$-$C_8$ chloro- and/or bromo- and/or iodo-containing fluoroolefins;
fluoroalkylvinylethers of formula $CF_2$=CFOR$_{f1}$, wherein $R_{f1}$ is a $C_1$-$C_6$ fluoroalkyl;
fluoro-oxyalkylvinylethers of formula $CF_2$=CFOR$_{O1}$, wherein $R_{O1}$ is a $C_1$-$C_{12}$ fluoro-oxyalkyl having one or more ether groups;
fluoroalkyl-methoxy-vinylethers of formula $CF_2$=CFOCF$_2$OR$_{f2}$ in which $R_{f2}$ is a $C_1$-$C_6$ fluoroalkyl, or a $C_1$-$C_6$ fluorooxyalkyl having one or more ether groups;
fluorodioxoles of formula:

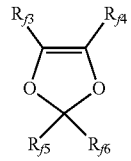

wherein each of $R_{f3}$, $R_{f4}$, $R_{f5}$, $R_{f6}$, equal or different each other, is independently a fluorine atom or a $C_1$-$C_6$ fluoro(halo)fluoroalkyl, optionally comprising one or more oxygen atom.

6. The method of claim 5, wherein polymer (I) is selected from fluorinated polymers consisting essentially of:
(1) recurring units derived from tetrafluoroethylene (TFE), in an amount of 25 to 99.9% moles, with respect to total moles of polymer (I);
(2) recurring units derived from at least one —$SO_2X$ groups-containing monomer selected from the group consisting of:
(j) sulfonyl halide fluorovinylethers of formula: $CF_2$=CF—O—$(CF_2)_mSO_2X$, with X being F or Cl, wherein m is an integer between 1 and 10;
(jj) sulfonyl fluoride fluoroalkoxyvinylethers of formula: $CF_2$=CF—(OCF$_2$CF($R_{F1}$))$_w$—O—CF$_2$(CF(RF$_2$))$_y$SO$_2$X with X being For Cl, wherein w is an integer between 0 and 2, $R_{F1}$ and $R_{F2}$, equal or different from each other, are independently F, Cl or a $C_1$-$C_{10}$ fluoroalkyl group, optionally substituted with one or more ether oxygens, y is an integer between 0 and 6; and
(jjj) mixtures thereof;
in an amount of 0.1 to 30% moles, with respect to total moles of polymer (I); and (3) optionally, recurring units derived from at least one fluorinated monomer different from TFE, in an amount of 0 to 45% moles, with respect to total moles of polymer (I).

7. The method of claim 6, wherein polymer (I) consists essentially of:
   (1) from 45 to 79.9% moles of recurring units derived from TFE;
   (2) from 0.1 to 10% moles of recurring units derived from said —$SO_2X$ groups-containing monomer(s) (2);
   (3) from 20 to 45% moles of recurring units derived from said fluorinated monomer(s) different from TFE (3).

8. The method of claim 7, wherein polymer (I) consists essentially of:
   (1) from 55 to 69.5% moles of recurring units derived from TFE;
   (2) from 0.5 to 5% moles of recurring units derived from said —$SO_2X$ groups-containing monomer(s) (2);
   (3) from 30 to 40% moles of recurring units derived from said fluorinated monomer(s) different from TFE (3).

9. The method of claim 6, wherein polymer (I) consists essentially of:
   (1) from 55 to 95% moles of recurring units derived from TFE;
   (2) from 5 to 30% moles of recurring units derived from said —$SO_2X$ groups-containing monomer(s) (2);
   (3) from 0 to 15% moles of recurring units derived from said fluorinated monomer(s) different from TFE (3).

10. The method of claim 9, wherein polymer (I) consists essentially of:
    (1) from 70 to 92% moles of recurring units derived from TFE;
    (2) from 8 to 20% moles of recurring units derived from said —$SO_2X$ groups-containing monomer(s) (2);
    (3) from 0 to 10% moles of recurring units derived from said fluorinated monomer(s) different from TFE (3).

11. The method of claim 6, wherein polymer (I) is selected from fluorinated polymers consisting essentially of:
    (1) from 40 to 99.5% moles of recurring units derived from TFE;
    (2) from 0.5 to 20% moles of recurring units derived from said —$SO_2X$ groups-containing monomer(s) (2);
    (3) from 0 to 40% moles of recurring units derived from said fluorinated monomer(s) different from TFE (3).

12. The method of claim 5, wherein:
    X is F and p is an integer of 2 or 3 when monomer (A) is a sulfonyl halide fluoroolefin;
    X is F and m is an integer from 2 to 4 when monomer (A) is a sulfonyl halide fluorovinyl ether;
    X is F, w is 1, $RF_1$ is —$CF_3$, y is 1 and $RF_2$ is F when monomer (A) is a sulfonyl fluoride fluoroalkoxyvinylether; and
    X is F when monomer (A) is a sulfonyl halide aromatic fluoroolefin.

13. The method according to claim 1, wherein salt (P) is selected from the group consisting of compounds having formulae (Px-1) to (Px-9):

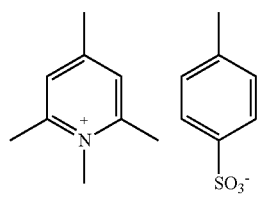
(Px-1)

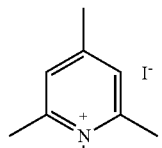
(Px-2)

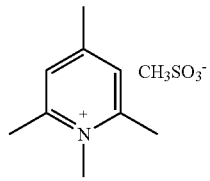
(Px-3)

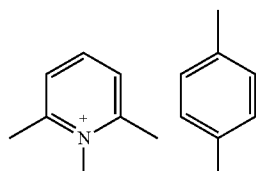
(Px-4)

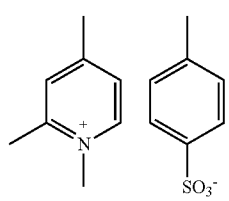
(Px-5)

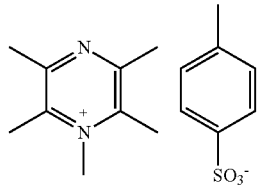
(Px-6)

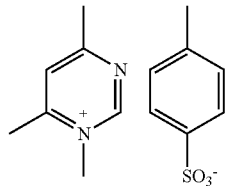
(Px-7)

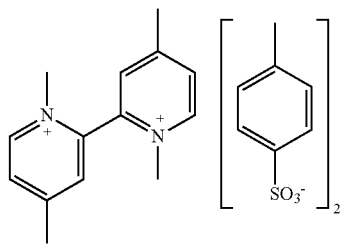
(Px-8)

-continued

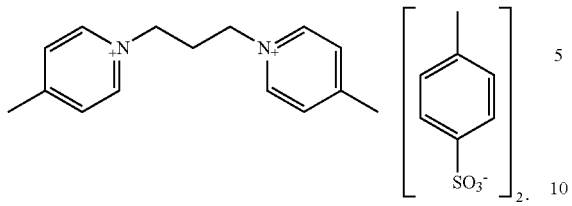

(Px-9)

14. The method according to claim 1, wherein polymer (I) is reacted with an amount of salt (P) of at least 0.1 weight part per 100 weight parts of polymer (I) (phr) and/or polymer (I) is reacted with an amount of salt (P) of at most 20 weight parts per 100 weight parts of polymer (I).

15. The method according to claim 14, wherein polymer (I) is reacted with an amount of salt (P) of at least 1 weight part per 100 weight parts of polymer (I) (phr) and at most 10 weight parts per 100 weight parts of polymer (I).

16. The method according to claim 1, wherein the base (B) is one or more than one organic base, one or more than one inorganic base or mixtures of organic and inorganic base(s), and wherein inorganic bases are selected from the group consisting of:
i) divalent metal oxides;
ii) hydroxides of metals;
iii) metal salts of weak acids having a pKa higher than 3; and \ organic bases are selected from the group consisting of:
(j) non-aromatic amines or amides complying with general formula (B1m) or (B1d):

$R_{bm}$—[C(O)]$_t$—NR$^H_2$   (B1m)

$R^H_2$N—[C(O)]$_t$—$R_{dm}$—[C(O)]$_{t''}$—NR$^H_2$   (B1d)

wherein:
each of t, t' and t", equal to or different from each other and at each occurrence is zero or 1;
each of $R^H$ is independently H or a $C_1$-$C_{12}$ hydrocarbon group;
$R_{dm}$ is a monovalent hydrocarbon non-aromatic group having 1 to 30 carbon atoms;
$R_{bm}$ is a divalent hydrocarbon non-aromatic group having 1 to 30 carbon atoms; and
(jj) cycloaliphatic secondary or tertiary amines complying with general formula (B2m) or (B2d):

(B2m)

(B2d)

wherein:
Cy represents a divalent aliphatic group comprising at least 4 carbon atoms, optionally comprising one or more than one ethylenically unsaturated double bond, and optionally comprising one or more catenary nitrogen atoms, forming a cycle with the nitrogen atom which is connected thereto;

Cy' represent a trivalent aliphatic group comprising at least 5 carbon atoms, optionally comprising one or more than one ethylenically unsaturated double bond, and optionally comprising one or more catenary nitrogen atoms, forming a cycle with the nitrogen atom which is connected thereto;
(jjj) aromatic amines or amides complying with general formula (B3):

$Ar_b$—{[C(O)]$_t$—NR$^H_2$}$_w$   (B3)

wherein:
t, equal to or different from each other and at each occurrence, is zero or 1;
w is an integer of 1 to 4;
each of $R^H$ is independently H or a $C_1$-$C_{12}$ hydrocarbon group;
$Ar_b$ is a mono- or poly-nuclear aromatic group, optionally comprising one or more than one catenary heteroatoms selected from the group consisting of S and 0;
(jv) heteroaromatic amines comprising at least one nitrogen atom comprised in a heteroaromatic cycle;
(v) guanidine derivatives of formula (B4) or (B5):

(B4)

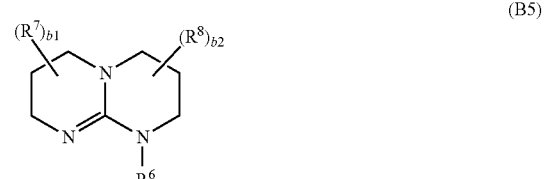

(B5)

wherein:
each of $R^1$, $R^2$, $R^3$, $R^4$, $R^5$, $R^6$, $R^7$, and $R^8$, equal to or different from each other, is independently H or a $C_1$-$C_{12}$ hydrocarbon group and corresponding salts of said guanidines (B4) and (B5);
(vj) metal alkoxylates.

17. The method according to claim 1, wherein reaction between polymer (I), base (B) and salt (P) is carried out in solid phase, in molten phase or in a liquid phase, wherein reacting "in the solid phase" polymer (I), base (B) and salt (P) means that base (B) and salt (P) and polymer (I) are reacted in conditions wherein all these components are in the solid state; wherein reacting "in the molten phase" polymer (I), base (B) and salt (P) means that base (B) and salt (P) are reacted with polymer (I) with polymer (I) being in the molten state; and reacting "in a liquid phase" polymer (I), base (B) and salt (P) means that base (B) and salt (P) are comprised in a liquid phase, which is contacted and reacted with polymer (I), and wherein polymer (I) may be present in the said liquid phase in dissolved form, in dispersed form, or in solid/suspended form.

18. The method according to claim 1, said method comprising hydrolysing at least a fraction of the —SO$_2$X groups of polymer (I) or of polymer (XPL), so as to provide corresponding —SO$_3$M groups, with M being H or a cation.

19. A cross-linked polymer (XLP) comprising polymer chains covalently bound one to the other through a bridging group of formula (XPL):

$$SO_2—C(R_a)(R_b)\text{-}py\text{-}C(R_a)(R_b)—SO_2—  \quad (XPL)$$

wherein:

$R_a$, and $R_b$ equal to or different from each other, are independently H or a hydrocarbon $C_1$-$C_6$ group;

Y, equal to or different from each other, is independently oxygen or a $C_1$-$C_{12}$ hydrocarbon group, optionally comprising one or more than one heteroatoms selected from N, O, S and halogens;

$A^{(m-)}$ is an anion having valency m;

py is a group of any of formulae (PXPL-1) to (PXPL-12):

-continued (P$_{XPL}$-12)

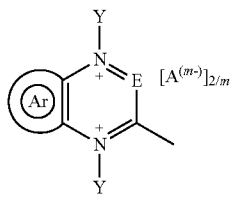

wherein:
each of J and J', equal to or different from each other, is independently at each occurrence C—R* or N, wherein R* is H or a C$_1$-C$_{12}$ hydrocarbon group;
E is N or a C atom bearing a free bond C—;
Z is a divalent hydrocarbon group comprising from 1 to 12 carbon atoms;
W is a bond or is a bridging group selected from the group consisting of divalent hydrocarbon groups comprising from 1 to 12 carbon atoms and divalent fluorocarbon groups comprising from 1 to 12 carbon atoms;
the group sketched with symbol:

in formula (P$_{XPL}$-11) and (P$_{XPL}$-12) designates an aromatic mono- or poly-nuclear ring condensed to the pyridinium-type aromatic ring, which optionally comprises one or more additional nitrogen atoms, optionally quaternized nitrogen atoms, in the ring(s); and in each of formulae (P$_{XPL}$-1) to (P$_{XPL}$-12), including groups E, where appropriate, the free bonds are either covalently bound to —C(R$_a$)(R$_b$)—SO$_2$— groups of formula (XPL), or are covalently bound to —H or to group (alpha-H), wherein group (alpha-H) is a group of formula:

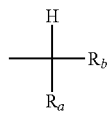

wherein R$_a$, and R$_b$, equal to or different from each other, are independently H or a hydrocarbon C$_1$-C$_6$ group; with the provisio that at least two free bonds are covalently bound to —C(R$_a$)(R$_b$)—SO$_2$— groups of formula (XPL).

20. The polymer (XLP) of claim 19, said polymer further comprising —SO$_2$X groups, with X being F or Cl, or —SO$_3$M groups, with M being H or a cation.

* * * * *

UNITED STATES PATENT AND TRADEMARK OFFICE
CERTIFICATE OF CORRECTION

PATENT NO. : 11,059,922 B2
APPLICATION NO. : 16/345674
DATED : July 13, 2021
INVENTOR(S) : Stefano Bossolo et al.

It is certified that error appears in the above-identified patent and that said Letters Patent is hereby corrected as shown below:

In the Claims
At Column 35, Claim number 1, Line number 22, the word "$R^1_X$" should read -- $R^1_H$ --,
At Column 37, Claim number 12, Line number 49, the word "$RF_1$" should read -- $R_{F1}$ --,
At Column 37, Claim number 12, Line number 49, the word "$RF_2$" should read -- $R_{F2}$ --.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*